(12) United States Patent
Harrison et al.

(10) Patent No.: US 11,207,935 B2
(45) Date of Patent: Dec. 28, 2021

(54) ELECTRONIC CONTROL DEVICE AND CONTROL CIRCUIT FOR AN AIR SUSPENSION SYSTEM OF A COMMERCIAL VEHICLE

(71) Applicant: Haldex Brake Products Aktiebolag, Landskrona (SE)

(72) Inventors: Dudley Harrison, Solihull (GB); Carl Mellings, Redditch (GB); Georg Sulzyc, Mannheim (DE); Christian Schering, Vreden (DE); Siegfried Heer, Wiesloch (DE); Stefan Becke, Altlussheim (DE); Joachim Noecker, Eberbach (DE); Tobias Tschoeke, Heidelberg (DE); Arne Busch, Frankenthal (Pfalz) (DE)

(73) Assignee: HALDEX BRAKE PRODUCTS AKTIEBOLAG, Landskrona (SE)

( * ) Notice: Subject to any disclaimer, the term of this patent is extended or adjusted under 35 U.S.C. 154(b) by 137 days.

(21) Appl. No.: 16/105,291

(22) Filed: Aug. 20, 2018

(65) Prior Publication Data

US 2018/0354333 A1    Dec. 13, 2018

Related U.S. Application Data

(63) Continuation-in-part of application No. PCT/EP2017/052745, filed on Feb. 8, 2017.

(30) Foreign Application Priority Data

Feb. 18, 2016    (EP) ..................... 16156357

(51) Int. Cl.
*B60G 17/015* (2006.01)
*F16K 31/53* (2006.01)
(Continued)

(52) U.S. Cl.
CPC ..... *B60G 17/0155* (2013.01); *B60G 17/0525* (2013.01); *B60G 17/0565* (2013.01);
(Continued)

(58) Field of Classification Search
CPC ............ B60G 17/0155; B60G 17/0565; B60G 2500/30; B60G 17/0525; B60G 2600/02;
(Continued)

(56) References Cited

U.S. PATENT DOCUMENTS

| 5,016,912 | A  | 5/1991 | Smith et al. |
|---|---|---|---|
| 6,623,016 | B2 | 9/2003 | Sulzyc et al. |

(Continued)

FOREIGN PATENT DOCUMENTS

| DE | 41 20 824 C1 | 6/1992 |
|---|---|---|
| DE | 42 02 729 C2 | 11/1993 |

(Continued)

OTHER PUBLICATIONS

PCT Search Report from co-pending, related PCT Application No. PCT/EP2017/052745, dated Aug. 12, 2018.

*Primary Examiner* — Nadeem Odeh
(74) *Attorney, Agent, or Firm* — Thomas | Horstemeyer, LLP

(57) ABSTRACT

An air suspension system of a commercial vehicle comprises an electronic control device with a level control valve device. A valve element is coupled to a drive element mechanically coupled to a vehicle wheel or axle. In a first relative position of the valve element and a counter valve element, a port for an air suspension bellow is blocked. In a second relative position, the port for the air suspension bellow is connected to a port for an aeration device. In a third relative position, the port for the air suspension bellow is connected to a port for a deaeration device. Control logic generates a control signal for an actuator which, when a
(Continued)

level change is set by an operator, correspondingly changes the relative position of the valve element and the counter valve element or the relative position of the counter valve element and a valve housing.

16 Claims, 26 Drawing Sheets

(51) Int. Cl.

| | | |
|---|---|---|
| *B60G 17/052* | (2006.01) | |
| *F16K 31/52* | (2006.01) | |
| *F16K 11/14* | (2006.01) | |
| *B60G 17/056* | (2006.01) | |

(52) U.S. Cl.
CPC ........... *F16K 11/14* (2013.01); *F16K 31/523* (2013.01); *F16K 31/53* (2013.01); *B60G 2202/42* (2013.01); *B60G 2202/442* (2013.01); *B60G 2204/116* (2013.01); *B60G 2204/4191* (2013.01); *B60G 2204/4193* (2013.01); *B60G 2400/0516* (2013.01); *B60G 2400/252* (2013.01); *B60G 2400/61* (2013.01); *B60G 2400/63* (2013.01); *B60G 2400/95* (2013.01); *B60G 2500/2022* (2013.01); *B60G 2500/30* (2013.01); *B60G 2600/02* (2013.01); *B60G 2600/07* (2013.01); *B60G 2600/1877* (2013.01); *B60G 2600/20* (2013.01); *B60G 2800/202* (2013.01); *B60G 2800/203* (2013.01); *B60G 2800/914* (2013.01); *B60G 2800/922* (2013.01)

(58) Field of Classification Search
CPC .......... B60G 2202/42; B60G 2400/252; B60G 2400/95; B60G 2500/2022; B60G 2800/202; B60G 2204/4193; B60G 2800/914; B60G 2600/07; B60G 2800/922; B60G 2800/203; B60G 2202/442; B60G 2400/63; B60G 2400/0516; B60G 2600/1877; B60G 2204/116; B60G 2400/61; B60G 2600/20; B60G 2204/4191; F16K 31/53; F16K 31/523; F16K 11/14
USPC ........................................................ 701/37
See application file for complete search history.

(56) References Cited

U.S. PATENT DOCUMENTS

| | | | |
|---|---|---|---|
| 6,840,279 | B2 | 1/2005 | Sulzyc et al. |
| 7,878,065 | B2 | 2/2011 | Chen |
| 2012/0146307 | A1 | 6/2012 | Kim |
| 2014/0333038 | A1* | 11/2014 | Gocz .................. B60G 17/0523 280/6.157 |

FOREIGN PATENT DOCUMENTS

| | | |
|---|---|---|
| DE | 199 16 040 A1 | 10/2000 |
| DE | 199 44 873 C1 | 1/2001 |
| DE | 101 29 143 C1 | 6/2002 |
| DE | 10 2005 017 590 B3 | 6/2006 |
| DE | 10 2005 017 591 B3 | 6/2006 |
| DE | 10 2005 019 479 20 | 1/2007 |
| DE | 300 31 554 T1 | 8/2007 |
| DE | 10 2006 006 439 B4 | 11/2008 |
| DE | 10 2014 103 842 A1 | 9/2015 |
| EP | 0 520 147 B1 | 4/1992 |
| EP | 0 520 148 B1 | 4/1992 |
| EP | 3 520 148 B1 | 4/1992 |
| EP | 1 214 210 B1 | 8/2000 |
| EP | 1 382 469 A2 | 7/2003 |
| EP | 1 687 160 B1 | 10/2004 |
| EP | 1 712 380 B1 | 4/2006 |
| EP | 2 067 638 B1 | 4/2006 |
| EP | 2 067 638 B2 | 4/2006 |
| EP | 1 986 874 B2 | 1/2007 |
| GB | 2 237 780 A | 5/1991 |
| GB | 2 280 877 A | 2/1995 |
| JP | H08 91034 A | 4/1996 |
| JP | 2002293122 A | 10/2002 |
| KR | 10-2010-01027395 A | 12/2010 |
| WO | 2014/124944 A1 | 8/2014 |

* cited by examiner

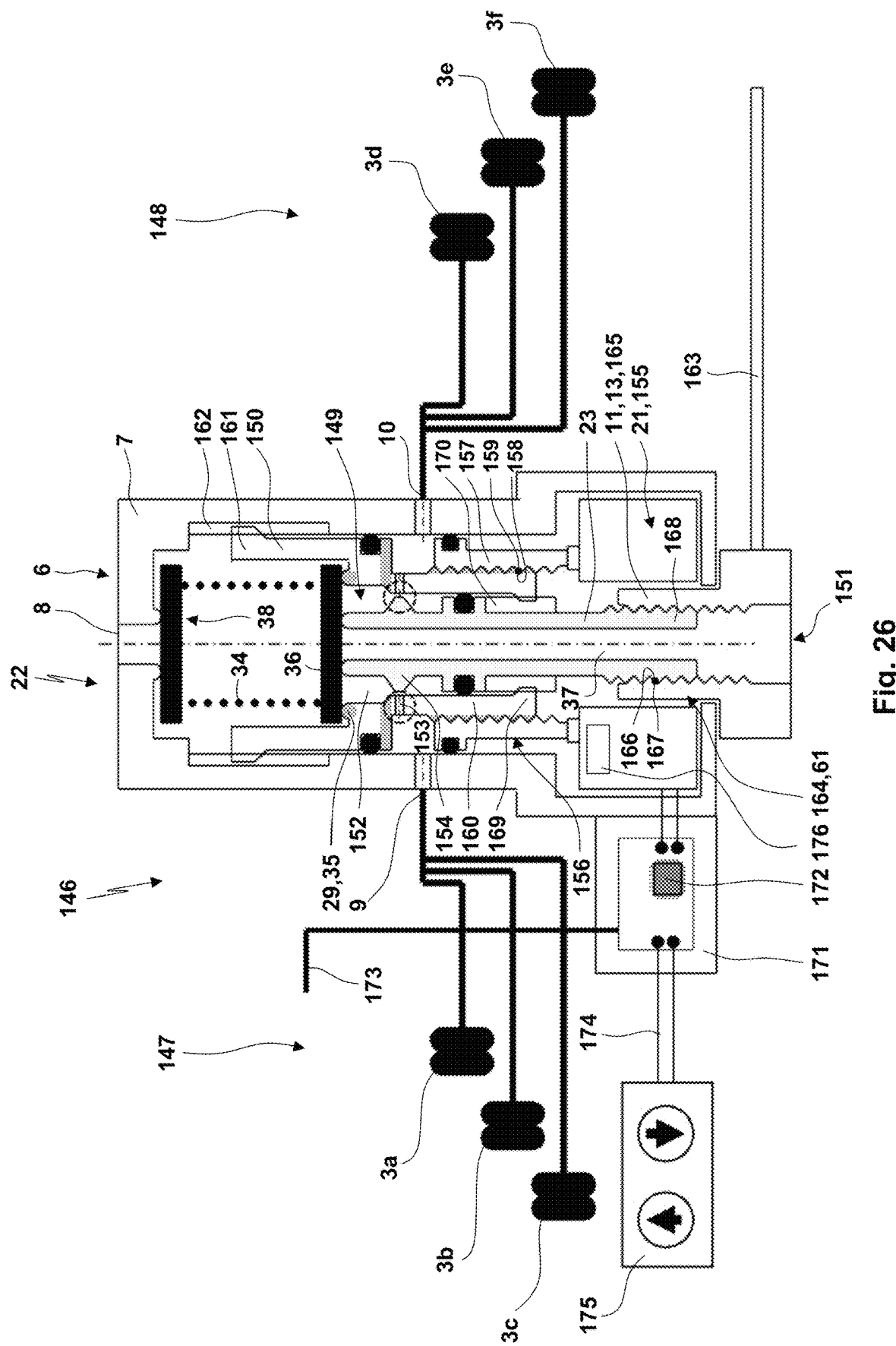

ELECTRONIC CONTROL DEVICE AND CONTROL CIRCUIT FOR AN AIR SUSPENSION SYSTEM OF A COMMERCIAL VEHICLE

CROSS REFERENCE TO RELATED APPLICATIONS

This application is a continuation in part of International Application PCT/EP2017/052745 with an international filing date of Feb. 8, 2017 and claiming priority to European Patent Application No. EP 16 156 357.2 entitled "Elektronische Steuereinrichtung and Steuerkreis für eine Luftfederungsanlage eines Nutzfahrzeugs", filed on Feb. 15, 2016.

FIELD OF THE INVENTION

The invention relates to an air suspension system of a commercial vehicle. The invention also relates to a use of the electronic control device for a special mechanically controlled level control valve device.

BACKGROUND OF THE INVENTION

On the one hand, mechanical level control valves are known in which a level change of a vehicle axle or a vehicle wheel is mechanically transferred to a valve element which for a level according to the preset level height (also referred to as reference level or zero level) blocks the air suspension bellow associated with the axle or the vehicle wheel, if a preset level height is fallen under takes up an opening position in which the air suspension bellow is aerated in order to raise the level and for a level height that is too large takes up an aerating position in which the air suspension bellow is deaerated in order to reduce the level.

Additionally, electronic level control devices are known in which via a sensor a level height is registered and by a control device comparing measured level height to a target value of a level height valve devices are controlled electronically, which then induce aeration, deaeration or blocking of the air suspension bellow in order to restore the preset level height.

It is also known to cumulatively employ a mechanical level control device and an electronic level control device, which then may be arranged in parallel pneumatic line branches or be arranged in series in one pneumatic line branch.

Furthermore, a level change manually induced at will may make sense, for example in order to adapt the vehicle body for loading or unloading at a ramp and/or in order to put the vehicle body down onto rubber buffers if the commercial vehicle is on a ship. In order to achieve this, manually actuated lifting-lowering valves are used which are integrated into the pressurized air connection to the air suspension bellows in addition to a mechanical level control valve or an electronic level control device.

With respect to the aforementioned prior art, documents EP 1 687 160 B1 (corresponding to US 2007/0080514 A1), GB 2 237 780 A, EP 1 382 469 A2, DE 41 20 824 C1 (corresponding to EP 0 520 148 B1), DE 42 02 729 C2 (corresponding to EP 0 520 147 B1), DE 199 16 040 A1, U.S. Pat. No. 5,016,912 B, DE 101 29 143 C1 (corresponding to U.S. Pat. No. 6,840,279 B2), GB 2 280 877 A, DE 199 44 873 C1 (corresponding to U.S. Pat. No. 6,623,016 B2), DE 10 2005 017 591 B3, DE 10 2005 017 590 B3 (corresponding to EP 2 067 638 B2) and DE 10 2005 019 479 B3 are referred to.

U.S. Pat. No. 7,878,065 B2 discloses a leveling valve device in which a pivotable arm is coupled to a vehicle axle. The pivoting of the arm is registered via a rotation sensor the signal of which is fed to a control unit. The control unit controls a servomotor which via a crank mechanism moves a valve slider. Depending on the position of the valve slider the air suspension bellow is aerated, deaerated or blocked. Preferably, the valve slider is biased in such a way that it takes up a blocking position when the servomotor is not supplied with a current.

US 2012/0146307 A1 discloses a mechanical level control valve in which the relative position of the housing with respect to the vehicle frame can be changed. In a first version, the change of the relative position of the housing of the mechanical level control valve with respect to the vehicle frame is a pivoting of the housing, while in a second version the housing is translationally shifted on the frame. The position changes of the housing of the mechanical level control valve for both versions result in a change of the reference level of the mechanical level control valve, for which then the level control is done mechanically. The change of the reference level is to be used for a level reduction in order to increase driving stability at high driving speeds, in order to lower the level for making loading and unloading of goods easier or to make approaching the cab easier. On the other hand, the change of the reference level may also be used in order to increase the level, for example when the vehicle is driven on an uneven road surface or an inclined road surface.

JP 2002 293122 A relates to a level control system for a bus. The bus has exactly two axles. To each of the axles, a level control valve is assigned, by means of which filling the two air suspension bellows of the axles is controlled at the same time. A target level for each axle and therefore both air suspension bellows is intended to be controlled in dependence of the driving speed in such a way that the level is lower at high speeds than at low speeds. In order to achieve this, the housing of the level control valve is shiftable with respect to the vehicle body in a vertical direction by aid of a step motor. Actuating the level control valve is achieved via two levers coupled in an articulated way, where the free end portion of one lever is coupled to the axle body and the free end portion of the other lever depending on the rotation angle of the axle body actuates an inlet or outlet valve of the level control valve.

JP H08 91034 A deals with an active reduction of a rolling angle when driving through curves. Furthermore, JP H08 91034 A describes the problem that when a level control valve reacts to a roll motion going back and forth belatedly, the roll angle may overshoot and the drive state become unstable. It is suggested in JP H08 91034 A to register a steering angle and a steering angle speed via a sensor and to aerate and deaerate the air suspension bellows on both sides of the vehicle alternatingly based on the registered steering angle signal. JP H08 91034 A suggests changing the length of a lever, one end portion of which is coupled to a vehicle axle and the other end portion of which is coupled to a lever actuating the level control valve, via an electronic control signal. In order to achieve this, the lever is realized as a rack-and-pinion drive. Controlling an electrical motor in order to drive the rack-and-pinion drive is done in dependence of the signal of a switch, a steering angle of a steering angle sensor and a speed signal in order to counteract a rolling angle possibly developing. At the same time, the control unit also controls a shock absorber. A control signal for controlling the step motor for the rack-and-pinion drive may be determined from an operating map. In the end, by controlling the length of the lever via the rack-and-pinion drive the intention is to give the impression that the air suspensions have a higher "pseudo-stiffness" when there is a steering motion.

KR 10-20 10-01 27395 A discloses a hybrid air suspension system in which a level control may be achieved by mechanical coupling elements on the one hand and by electronic control by means of a signal from a sensor unit or a passenger of the vehicle on the other hand. The passenger may activate an off-road mode via a user interface in order to lift the vehicle level. The sensor unit based on which electronic level control may be done may be a level sensor, a driving speed sensor, a sensor for sensing the steering angle speed, a throttle flap sensor or a three-axial acceleration sensor. The mechanical level control is induced via a mechanical movement of a valve body via a first rack-and-pinion drive, where the valve body is fixedly connected to a rack and a rotation of a pinion is achieved via levers connected to each other in an articulated way and coupled to the vehicle axle. The electronic change of the level, on the contrary, is achieved via a second rack-and-pinion, drive the pinion of which is driven via an electric motor while the rack is fixedly connected to a housing of the level control valve. Depending on the relative position between the housing and the valve body, the level control valve takes up a blocking position, a deaerating position or an aerating position for an air suspension bellow of the vehicle axle. An electronic level control is intended to be carried out in order to avoid the vehicle rolling when there is a steering motion, to avoid the vehicle pitching when there is a sudden braking, for changing the level depending on the driving speed or when an off-road switch is operated or similar.

SUMMARY OF THE INVENTION

The present invention relates to an air suspension system of a commercial vehicle comprising an electronic control device comprising a control outlet and a level control valve device connected to the control outlet of the electronic control device. The level control valve device comprises a port for an air suspension bellow, a port for an aeration device and a port for a deaeration device, a drive element, a valve element and a a counter valve element and an actuator. The drive element can be mechanically coupled to a vehicle wheel or a vehicle axle. The valve element is coupled to the drive element by means of a drive mechanism, so that a movement of the drive element induces a change of an operating position of the valve element. The valve element and the counter valve element have a first relative position, wherein the port for the air suspension bellow is blocked, a second relative position, wherein the port for the air suspension bellow is connected to the port for the aeration device and a third relative position, wherein the port for the air suspension bellow is connected to the port for the deaeration device. The actuator is controlled via a control outlet of the electronic control device. The electronic control device comprises control logic, which generates a control signal for the actuator at the control outlet which induces a change of the relative position of the valve element and the drive element or the relative position of the counter valve element and a housing accommodating the valve element and the counter valve element and when a level change for lifting or lowering a vehicle body at a ramp is set manually by an operator changes the relative position of the valve element and the counter valve element or the relative position of the counter valve element and the housing accommodating the valve element or the counter valve element corresponding to the level change set by the user.

The novel air suspension system and the new use of an electronic control device enable controlling a mechanically actuated level control valve device for a supplementary electronic influence on the level. Especially, it is intended to take into account demands of construction space, the ability of retrofitting an existing air suspension system, the effort necessary for mounting and the possibilities of control.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon illustrating the principles of the present invention. In the drawings, like reference numerals designate corresponding parts throughout the several views.

FIG. 26 schematically shows an air suspension system with a mechanical level control valve with an integrated actuator via which a reference position of the mechanical level control valve correlating with a reference level of the air suspension device can be changed.

DETAILED DESCRIPTION

Figure 1:
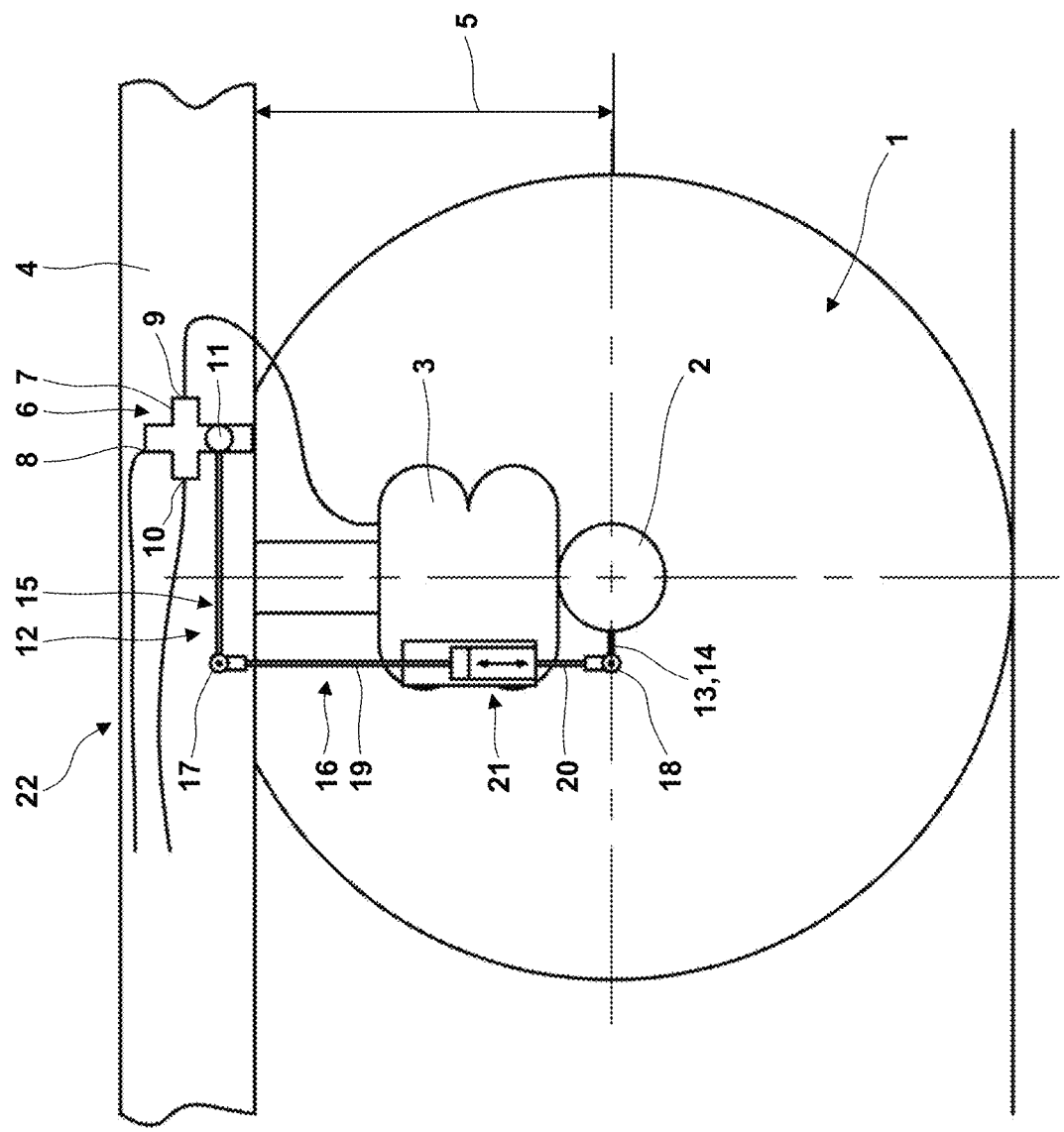
FIGS. 1 and 2 schematically show level control valve devices in which an electronically controllable actuator is arranged in a mechanical coupling mechanism between a vehicle wheel and a vehicle axle and a level control valve.

The present invention proposes an air suspension system comprising an electronic control device having a control outlet for a special mechanically actuated level control valve device. In the following, this special level control valve device to control which the electronic control device is suitable is described first:

In the special level control valve device, differently to the proposal according to document US 2012/0146307 A1, a housing of the level control valve device is not movable relative to the vehicle frame but, rather than that, fixed to the vehicle frame. For the special level control valve device, at a fixed position and orientation of a housing of the mechanically actuated level control valve device a reference position of the level control valve device can be changed. A change of the reference position may be induced, for example, by a manual setting by the user, for example for lifting or lowering the vehicle body at a ramp. It is also possible, however, that the reference position is changed during driving operation within an electronic control. The reference position correlates with a blocking position of the level control valve device, in which there is no level change. The reference position is a relative position of the components of the level control valve device which take part in aerating, deaerating and/or blocking the port for the at least one air suspension bellow. For other level control devices, when such a change in the reference position occurs, it is problematic that in the case of a loss of electric power supply (in the case of a drop of the same or for deactivation of the electric power supply) usually there is an automatic reset from the changed reference position into a predefined reference position due to the mechanical level control. For the special level control valve device, this is not the case. Rather than that, the changed reference position is preserved even when there is no electric power supply, while there even still may be a mechanic level control. If, for example, the electric power supply drops out after a level height has been set on a ramp, the set level height is kept up with the mechanical level control even when there is further loading or unloading of the commercial vehicle, without manual control being necessary in order to keep up the level height depending on the change in the load state. To mention only one other, non-limiting example, during drive operation a changed reference position may be preserved which then is also preserved in an emergency with an electrical power supply with a possible mechanical level control, in which way safety in operation can be increased.

The level control valve device comprises a drive element which can be mechanically coupled with a vehicle wheel or a vehicle axle and which is moved according to the present level. The drive element may be directly arranged on the vehicle wheel or the vehicle axle or coupled to them e.g. via a mechanical coupling mechanism. The drive element represents a current level of the vehicle wheel or the vehicle axle or a corresponding air suspension bellow. Additionally, the special level control valve device comprises a valve element. The valve element is mechanically coupled to the drive element so that by a movement of the drive element, that is, by a level change, a movement of the valve element may be induced. Depending upon the gearing-up or gearing-down ratio, the movement of the valve element with respect to the kind of the degree of freedom as well as with respect to the amount of movement may differ from the movement of the drive element. The valve element cooperates with a counter valve element. With the valve element and the counter valve element, a valve with any number of ways and/or ports may be formed. If, for example, such a valve is realized as a sliding valve, the valve element can form the valve slider while the counter valve element is formed by the bore or a sleeve, in which the valve slider is slidable for the different valve positions. If, on the contrary, the valve is realized as a seated valve, the valve element may be formed by a valve plunger while the counter valve element is formed by a valve seat. To mention only a further non-limiting example, when the valve is realized with a disc (cp. e.g. the documents DE 600 31 554 T2 (corresponding to EP 1 214 210 B1), DE 10 2014 103 842 A1 and DE 10 2006 006 439 B4 (corresponding to EP 1 986 874 B2)), the valve element and the counter valve element may each be realized as a valve disc. Depending on the relative position of the valve element and the counter valve element, due to the interaction between the valve element and the counter valve element in a first relative position a port for an air suspension bellow is blocked, in a second relative position the port for an air suspension bellow is connected to a port for an aeration device and/or in a third relative position the port for the air suspension bellow is connected to a port for a deaeration device. In this way, between the valve element and the counter valve element a valve cross section or a transfer cross section of the valve is formed which in the first relative position is blocked and in the second relative position and/or the third relative position is opened in order to establish the aforementioned connections. The first relative position, the second relative position and the third relative position may be discrete positions or position ranges, where in the last-mentioned case it is also possible that for a position range the size of a transfer cross section for aerating and/or deaerating changes depending on the position in the position range.

The special level control device is not purely mechanically actuatable, that is, corresponding to the difference of the present level from a fixedly set reference level by mechanically changing the relative position of the valve element and the counter valve element. Rather than that, in the special level control device an electronically controllable actuator is also present. This may be an electronically controlled drive motor, possibly with a corresponding transmission mechanism or a coupling mechanism, or a pneumatic adjusting cylinder that can be actuated by electronically controlled valves or a pneumatic drive such as a pneumatic multi-disc motor or a pneumatic rotary piston motor. By means of the actuator, the relative position of the valve element and the drive element may be changed. Alternatively or cumulatively is possible that via the actuator the relative position of least one counter valve element with respect to a housing accommodating the valve element and the counter valve element may be changed. Both alternatives lead to the relative position between the valve element and the counter valve element being changeable when the actuator is operated. While for a classical mechanical level control valve a change of this relative position (and therefore the opening, blocking and closing of the level control valve) only depends on the position of the drive element, that is, the preset level, for the special level control device the relative position between valve element and counter valve element may also be changed by operating the actuator, in which way therefore without a movement of the drive element a change of the relative position may be induced and therefore the valve formed by the valve element and the counter valve element may be electronically controlled into an aerating position, a deaerating position and a blocking position. It is also possible that via the actuation of the actuator the reference level is changed. During operation of the commercial vehicle it is also possible that cumulatively on the one hand a movement of the valve element due to a movement of the drive element and on the other hand a change of the relative position between the valve element and the counter valve element or between the counter valve element and the housing is induced by electronic control of the actuator (which shall include open-loop control and closed-loop control). By means of the electronically controllable actuator, therefore an alternative or cumulative mechanical and electronic actuation of the level control valve can be provided, where preferably for both modes of actuation for the aeration and/or deaeration of the air suspension bellows the same valve components and the same valve cross sections or opening cross sections formed between these valve components are used, in which way the effort made in building can be significantly reduced. Preferably, the actuator is integrated into the level control valve device.

The electronic control device of the air suspension system according to the invention at a control outlet of the electronic control device generates a suitable control signal for controlling the actuator of the special level control valve device. In order to achieve this, the control device comprises control logic. The control logic at the control outlet generates a control signal for the actuator effecting the electronic setting of the special level control valve device. Accordingly, the control signal is generated by the control logic in such a way that a change of a relative position of a valve element and a drive element is generated. Alternatively or cumulatively, it is possible that the control signal is generated by the control logic in such a way that a relative position of a counter valve element with respect to a housing accommodating the valve element and the counter valve element is generated.

While for an electronic control device according to prior art at a control outlet for an electronic level control a control signal is generated which controls an aeration valve, a deaeration valve and/or a blocking valve and therefore especially includes binary switching signals ON/OFF, the control signal generated by the control logic at the control outlet for operating an actuator comprising a shifting or pivoting with shifting positions or pivoting positions being adjustable in steps or steplessly. If a reference position of the level control valve device is intended to be changed, the control signal is determined by the control logic in such a way that it induces a shift or a pivoting of the actuator corresponding to the difference of the changed desired reference position from the reference position effective before. After the actuator has been actuated resulting in the shift or the pivoting to the desired extent, the control logic no longer generates a control signal controlling the actuator in order to generate a shift or a pivoting. It is, e.g., possible that the control signal is proportional to the change of the reference position. It is, e.g., also possible that the actuator is realized with a step motor. In this way the control signal causes a number of steps to be induced by the actuator, where the number of steps correlates with the desired change of the reference position or the desired level change. Within the framework of the invention it is possible that such a control signal is not only used for a temporary change of the reference position of the special level control valve device but also used for dynamic changes of the level and/or for blocking the level control valve device for example in order to avoid co-called cycling.

A further solution to the problem on which the invention is based is using an electronic control device with a control outlet for a mechanically controlled level control valve device and control logic in order to generate the control signal for the special level control valve device explained before.

According to the invention, the control device comprises control logic which generates a control signal for the actuator if a level change, namely a demand for a lifting or lowering of the vehicle body at a ramp, that is, a demand for a change of the reference level, is set manually by the user. The control signal is determined by the control logic in such a way that based on the control signal the actuator changes the relative position of the valve element and the counter valve element as desired by the user. If the user by manual input therefore desires a lifting (or lowering) of the vehicle body, the control signal is generated by the control logic in such a way that the relative position changes towards the second relative position (or the third relative position). In this way, according to the invention the function of a manual lifting-lowering valve can be integrated into the level control valve device without substantial additional effort. In this case, however, additional valve elements do not have to be provided in order to guarantee manual lifting and lowering. Rather than that, it is sufficient to provide a switch, lever or similar via which the user may give his or her desire for lifting or lowering, which then is fed to the control device and is further processed by the control logic.

For a further proposal, the control device comprises control logic, which for a dynamic level change in drive operation generates a control signal for the actuator. Based on this control signal, the actuator changes the relative position of the valve element and the counter valve element in such a way that a change of the relative position of the valve element and the counter valve element results the absolute value of which is larger than the absolute value of the change of the relative position of the valve element and the counter valve element which would have resulted from purely mechanical level control. In order to mention only a non-limiting example, during drive operation a small level change at purely mechanical level control may lead to an aerating cross section being opened which, however, for the small level change is comparatively small, so that the level adaption would be comparatively slow and with little dynamics. In this case, the control signal may control the actuator in such a way that it changes the relative position of the valve element and the counter valve element in such a way that a larger opening cross section results, in which way—stated simply—a larger deviation of the actual level from the reference level being present may be simulated. Enlarging the valve cross-section results in the level change being faster and more dynamic. When the reference level is reached again, the actuator may be reset by a control signal correspondingly determined by the control logic.

Generally, any superposition of the electronic level control due to the collaboration of the electronic control device with the control logic, the control signal and the actuator on the one hand and the purely mechanical level control on the other hand is imaginable, where it is also possible for the mechanical level control to be corrected with the electronic level control. For a further proposal of the invention, the control logic of the control device for a dynamic level control in drive operation generates a control signal. On the basis of the control signal, the actuator changes the relative position of the valve element and the counter valve element in such a way that the valve element and the counter valve element remain in the first relative position or are transferred into this first relative position although for purely mechanical level control they would be in the second or third relative position. In order to mention a non-limiting example here for a function made possible according to the invention, during drive operation an undesired so-called "cycling" occurs, in which oscillations of the vehicle body about a vehicle longitudinal or transverse axis lead to a successive aeration and deaeration of the air suspension bellow if there is purely mechanical level control, with which an undesiredly high use of pressurized air is connected. Such a cycling occurs for example due to oscillations around the roll axis when driving through a curve or oscillations around the pitch axis when stopping the car at a traffic light. According to the invention, in such operating situations, which can be detected based on information known anyway, for example via a bus system, the control logic can control the actuator to induce the first relative position, in which way the air suspension bellows are blocked and the undesired consumption of pressurized air does not occur.

According to a further proposal of the invention, the control device comprises an inlet. Via the inlet, a dump signal for a trough or a vehicle body is fed to the control device. Tilting the trough or the vehicle body results in a shift of the gravity center, which possibly is undesired and in the worst-case leads to the commercial vehicle tipping over. According to the invention, the control logic of the control device generates a control signal on the control outlet for the mechanically controlled level control valve device. This control signal controls the actuator in such a way that a change of the level is induced which at least partially compensates a shift of the gravity center of the vehicle body or the trough due to a tilting of the trough or the vehicle body. In this way, the safety of operation of the commercial vehicle can be increased.

For a further proposal of the invention, the electronic control device is equipped with a further function: In this case, the control device comprises control logic which at a control outlet generates a reset-to-ride control signal for a manually actuated lifting-lowering selector valve. If the operator causes a manual change of the level (e.g. at a ramp) by manually bringing the lifting-lowering selector valve into a stable stop position or a locked or latched lifting position or lowering position, the mechanical level control of the level control valve device by the lifting-lowering selector valve may possibly be deactivated. If then the drive operation of the commercial vehicle is begun and if the operator forgets to return the lifting-lowering selector valve into the drive position, the mechanical level control not occurring can lead to damages to the commercial vehicle and to unstable drive states. The control logic of the control device for this embodiment recognizes the restart of drive operation (e.g. by means of a speed signal, the actuation of a brake, a gear selector lever, the ignition, a brake light signal or similar) and generates the reset-to-ride control signal by means of which the lifting position or lowering position of the lifting-lowering selector valve is unlocked or unlatched and/or a return of the lifting-lowering selector valve into the drive position, in which the mechanical level control is activated, is induced.

It is possible that the control device comprises at least one unidirectional port. For a special proposal, the electronic control device comprises (at least) one bidirectional port. It is for example possible that via such a bidirectional port on the one hand a signal with respect to the level is received by the control device from a level sensor of the level control valve device and on the other hand via the bidirectional port the control signal is transmitted in order to control the actuator of the level control valve device. Alternatively or cumulatively it is possible that the control device comprises an interface for a bus system.

As explained before, a lifting and/or lowering of the vehicle body can be induced by means of a manually actuated lifting-lowering selector valve, in which preferably mechanical-pneumatic valves are actuated by the operator. In a further embodiment of the invention (alternatively or cumulatively), a mechanical-electrical operating element is present, via which the operator can set a change of a reference level and/or the demand for a lifting or lowering of the vehicle body and by means of which an electric operating signal is generated which correlates with the aforementioned demand of the operator. This electrical operating signal is then used by the control device in order to control the actuator of the level control valve device with the control signal in such a way that it realizes the demand of the operator. Within the framework of the invention, the control device itself may comprise the mechanical-electrical operating element as an integral construction unit. It is also possible that the mechanical-electrical operating element is realized externally of the control device, where in this case the control device comprises a port for receiving an electrical operating signal of the operating element. When the air suspension system comprises the manually actuatable mechanical-electrical operating element, the electrical operating signal depending on the demand of the operator and set via the operating element is fed to a control inlet of the electronic control device.

According to a further proposal of the invention, the control device is realized as an ABS control unit or an EBS control unit.

According to a further proposal of the invention, the control device comprises an electric control outlet, which can be connected to a valve or a control unit of a load transfer valve device. Such a load transfer valve device serves for controlling the biasing of air suspension bellows of different axles in such a way that, if possible, on the axles a predefined axle load distribution, especially the same axle loads, results. In this case, therefore the control device can determine a control signal for controlling the load transfer valve device.

It is also possible that the air suspension system comprises a manually actuatable mechanical-pneumatic lifting-lowering selector valve, via which an operator is able to induce a change of the level by mechanical actuation.

For a further control circuit according to the invention, at least one sensor is present. The sensor may sense a relative position of the drive element or the drive spigot and the actuating element or a position of the drive element, the drive spigot and/or the actuating element. The sensor generates a corresponding signal. In this case, the control logic of the electronic control device based on a signal of the or at least one sensor determines the control signal for the actuator of the level control valve device.

Generally, any superposition of the electronic level control due to the collaboration of the electronic control device with the control logic, the control signal and the actuator on the one hand and the purely mechanical level control on the other hand is imaginable, where it is also possible that the mechanical level control is corrected by the electronic level control. For a further embodiment of the air suspension system according to the invention, the control logic of the control device for a dynamic level control in drive operation generates a control signal. On the basis of the control signal, the actuator changes the relative position of the valve element and the counter valve element in such a way that the valve element and the counter valve element remain in the first relative position or are transferred into this first relative position although for purely mechanical level control they would be in the second or third relative position. In order to mention a non-limiting example here for a function made possible according to the invention, during drive operation an undesired so-called "cycling" occurs, in which oscillations of the vehicle body about a vehicle longitudinal or transverse axis lead to a successive aeration and deaeration of the air suspension bellows if there is purely mechanical level control, with which an undesiredly high use of pressurized air is connected. Such a cycling occurs for example due to oscillations around the roll axis when driving through a curve or oscillations around the pitch axis when stopping the car at a traffic light. According to the invention, in such operating situations, which can be detected based on information known anyway, for example via a bus system, the control logic can control the actuator to induce the first relative position, in which way the air suspension bellows are blocked and the undesired consumption of pressurized air does not occur.

If the vehicle is realized especially as a bus or coach or a rail-bound vehicle it is possible that a lowering of the level occurs (including a tilting of the vehicle body) in order to make it easier for passengers to get on or off board. In this context, the invention proposes for the control logic of the electronic control device to comprise control logic, which generates a control signal for the actuator in order to detect passengers getting on or off board being imminent. Based on the control signal, the actuator changes the relative position of the valve element and the counter valve element in such a way that a reduced driving height results, which simplifies getting on or off board. Detecting the (imminent) getting on or off board may be done based on a signal given manually by the driver or an actuation of a switch by a passenger in the vehicle in order to indicate that the passenger wants to get off board or by a person outside the vehicle who wants to get on board the vehicle. Alternatively or cumulatively it is possible that in order to detect an end of the passengers getting on board or off board the control logic creates a control signal for the actuator. Based on this control signal, the actuator then changes the relative position of the valve element and the counter valve element such a way that a predefined driving height results. Detection occurs preferably by evaluating a signal given by the driver.

Referring now in greater detail to the drawings, FIG. 1 in a strongly schematic way and in a detail of a commercial vehicle shows the support of a vehicle wheel 1 or a vehicle axle 2 on a vehicle frame 4 or vehicle body via an air suspension bellow 3. By aerating and deaerating the air suspension bellow 3, the change of a level 5 describing the distance of the rotational axis of the vehicle wheel 1 or the vehicle axle 2 from the vehicle frame 4 may be changed. The air suspension bellow 3 may for example be aerated or deaerated in order to compensate dynamic level changes due to an acceleration, a braking, when driving through curves, due to an uneven road surface or in order to purposely induce a level change, e.g. manually by a user for lifting the vehicle frame 4 onto the height of a ramp or for changing the level 5 when driving on a motorway or in dependence of the unevennesses of the road surface. In this context, a change of a current level is made towards a fixedly preset reference level or a reference level changeable via a control unit or by the user.

Controlling the aeration and deaeration of the air suspension bellow 3 is achieved via a level control valve 6. This level control valve 6 is realized as a singular construction unit, which possibly may also be modular, and comprises a housing 7 by which the level control valve 6 is mounted and fixed to the vehicle frame 4. The level control valve 6 comprises pneumatic ports, which here are a port 8 for connecting to a pressurized air source, a port 9 for connecting to the air suspension bellow 3 and a port 10 for connecting to another air suspension bellow (not shown here) corresponding to another vehicle axle or another vehicle wheel. Furthermore, the level control valve 6 comprises a rotatable driveshaft 11, where the aeration and the deaeration and the blocking of the air suspension bellow 3 are mechanically controlled via the rotation of the driveshaft 11.

Via a mechanical coupling mechanism 12, the driveshaft 11 is mechanically coupled to a drive element 13 which is supported by the vehicle axle 2 or the vehicle wheel 1 and is vertically moved with the level change without rotating along with the rotation of the vehicle wheel 1. For the embodiment according to FIG. 1, the drive element 13 is realized as a drive bar 14, which is linked to the vehicle axle 2 or the vehicle wheel 1 in an end portion.

The coupling mechanism 12 comprises two coupling bars 15, 16, which are pivotably connected to one another via a joint 17. The coupling bar 15 is fixed to the end portion of the driveshaft 11 turned away from the joint 17, so that the pivoting of the coupling bar 15 corresponds to the pivoting of the driveshaft 11. In the end portion turn away from the joint 17, the coupling bar 16 is linked to the drive bar 14 via a joint 18. Changing the level 5 leads to a change of the angles between the drive bar 14, the coupling bar 15 and coupling bar 16, and therefore to a rotation of the driveshaft 11.

For the embodiment according to FIG. 1, the coupling bar 16 comprises two coupling bar parts 19, 20. The coupling bar parts 19, 20 are connected with one another via an actuator 21. The actuator 21 is electronically controlled in order to change its length, in which way the distance of the coupling bar parts 19, 20 changes and the length of the coupling bar 16 changes. In this way, by control of the actuator 21 (independently of a change of the level 5) a rotation of the driveshaft 11 may be induced, in which way electronically an aeration or deaeration or a blocking of the air suspension bellow 3 may be induced and a change of a reference level may be provided.

As the actuator 21, any actuator for creating a longitudinal displacement can be employed. To mention only an example, the actuator 21 may be realized as a single-acting pneumatic cylinder acting against a spring or as a double-acting pneumatic cylinder, the displacement of which is controlled by an electronic control of at least one solenoid valve. It is also possible that a spindle drive, a actuating motor with a worm gear mechanism or a step motor may be employed in order to generate a displacement in the longitudinal direction, to mention only some non-limiting examples. Different to FIG. 1, alternatively or cumulatively an actuator 21 may also be integrated into the coupling rod 15 to induce a change of the length of the coupling rod 15. Transferring a pneumatic and/or electric signal for the control of the actuator 21 may be achieved via a free line or by a line integrated into the coupling mechanism 12 or mounted to the coupling mechanism 12.

Figure 2:
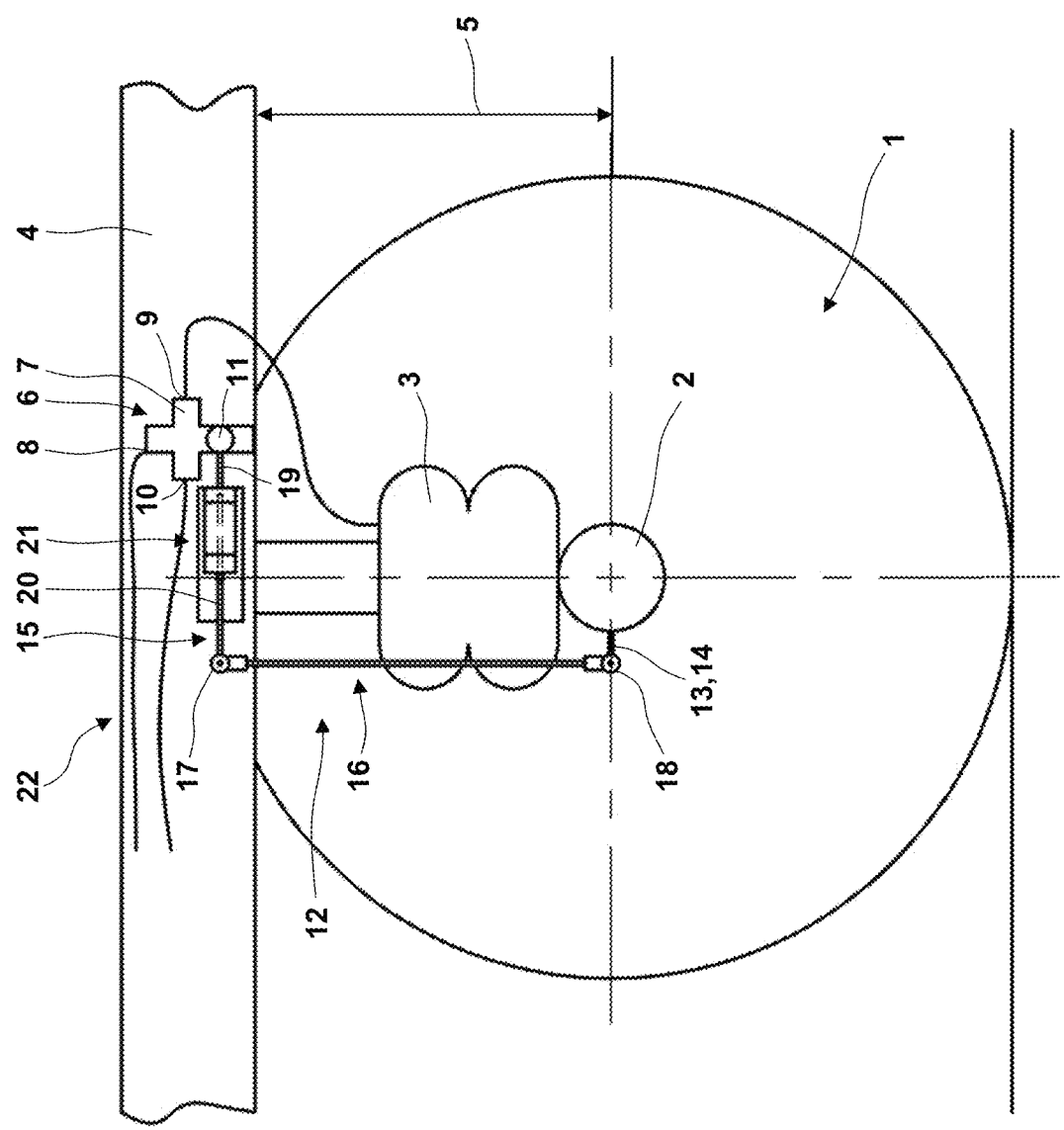

While for the embodiment according to FIG. 2 generally the same things are true as have been said with regard to FIG. 1, an actuator 21 connecting the coupling bar parts 19, 20 is employed here in the coupling bar 15 which does not change the length of the coupling bar 15, but, rather than that, changes the angle between the coupling bar parts 19, 20. In this way, a rotation of the driveshaft 11 may also be induced independently of a change of the level 5. It is also possible that in at least one coupling rod 15, 16 at least one actuator 21 is employed, via which the length of the coupling rod as well as an angular position of the coupling rod parts of this coupling rod is changed.

For FIGS. 1 and 2, the level control valve device 22 is realized with the level control valve 6, the mechanical coupling mechanism 12 and the actuator 21 integrated into the mechanical coupling mechanism 12. Generally, the level control valve 6 may be realized in a way corresponding to a common level control valve. Although the level control valve device 22 enables the mechanical control via the mechanical coupling to the vehicle wheel 1 or the vehicle axle 2, the level control valve device 6 preferably does not have electronic components, no electronic control port and no control unit. Rather than that, the electronically controlled components are integrated into the mechanical coupling mechanism 12.

The following FIGS. 3 to 13, on the contrary, show embodiments in which the level control valve device 22 enabling the mechanical level control depending on the level 5 as well as the electronic level control is realized by the level control valve 6. In this case, the driveshaft 11 of the level control valve 6 realizes the drive element 13. The position of the drive element 13 relative to the valve element 23 is intended to be controlled electronically.

Figure 3:
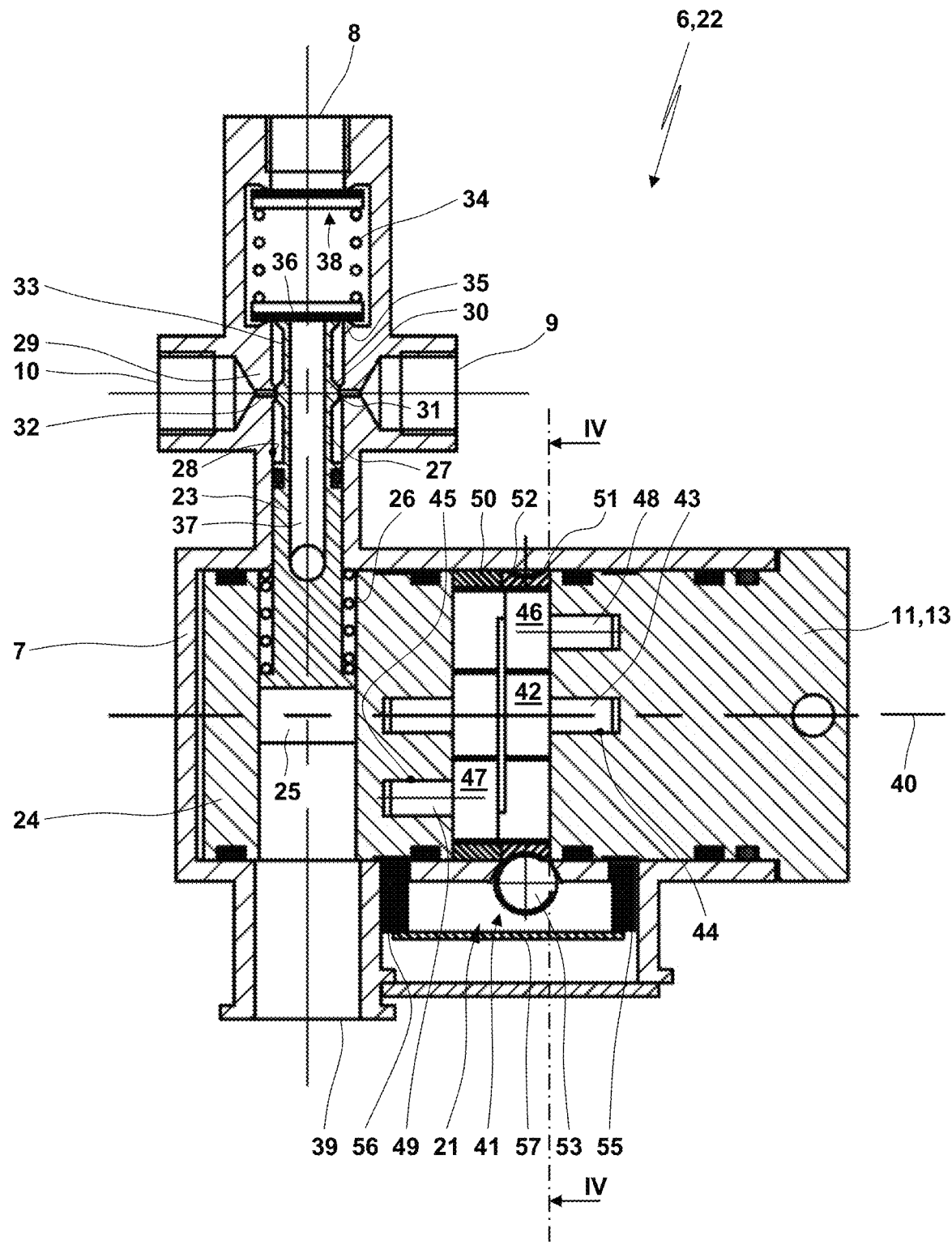
FIG. 3 shows a longitudinal section through a level control valve device with an actuator comprising a planetary gear mechanism, realized as a level control valve.
Figure 4:
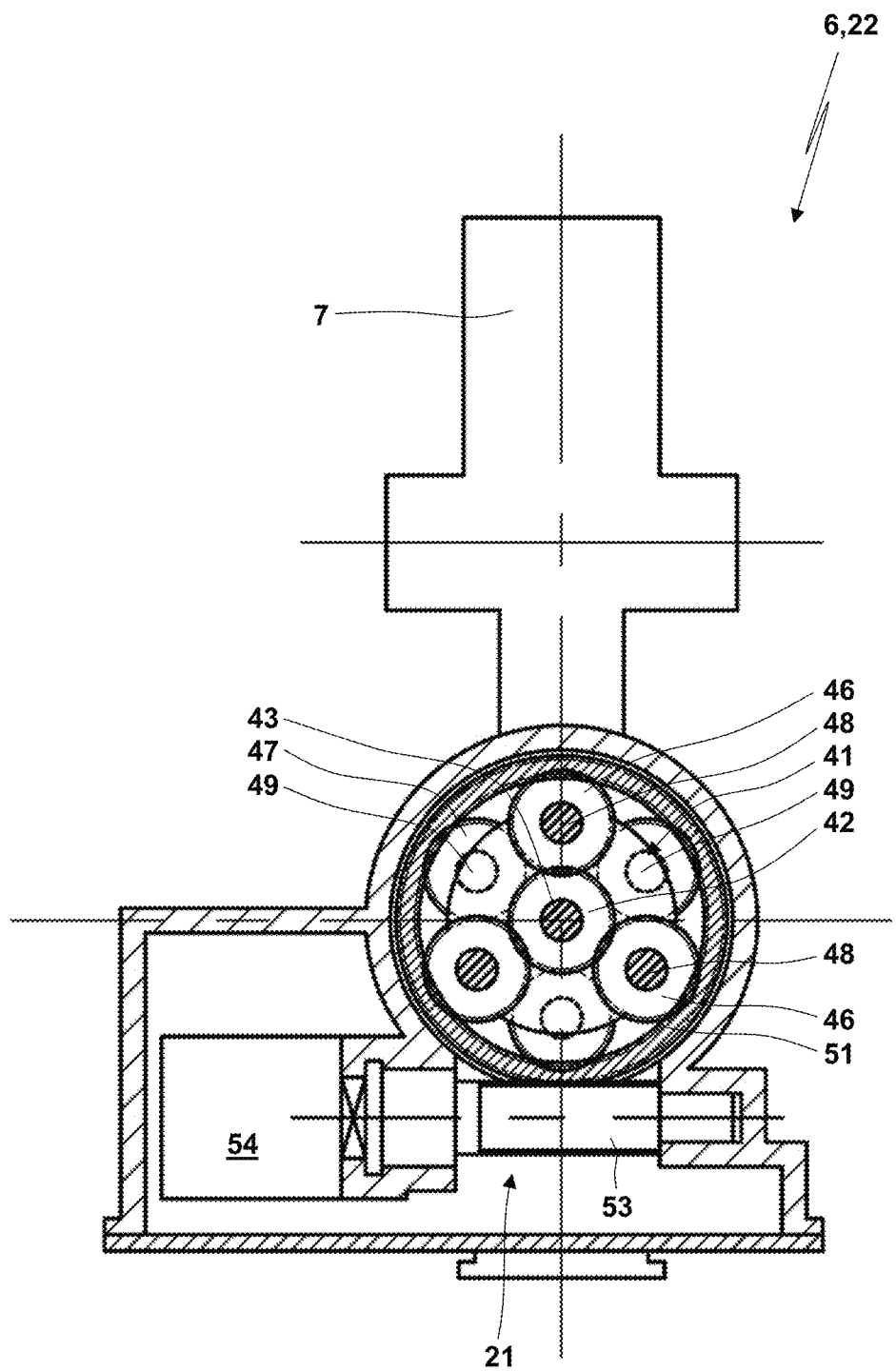
FIG. 4 shows a section IV through the level control valve according to FIG. 3.
Figure 5:
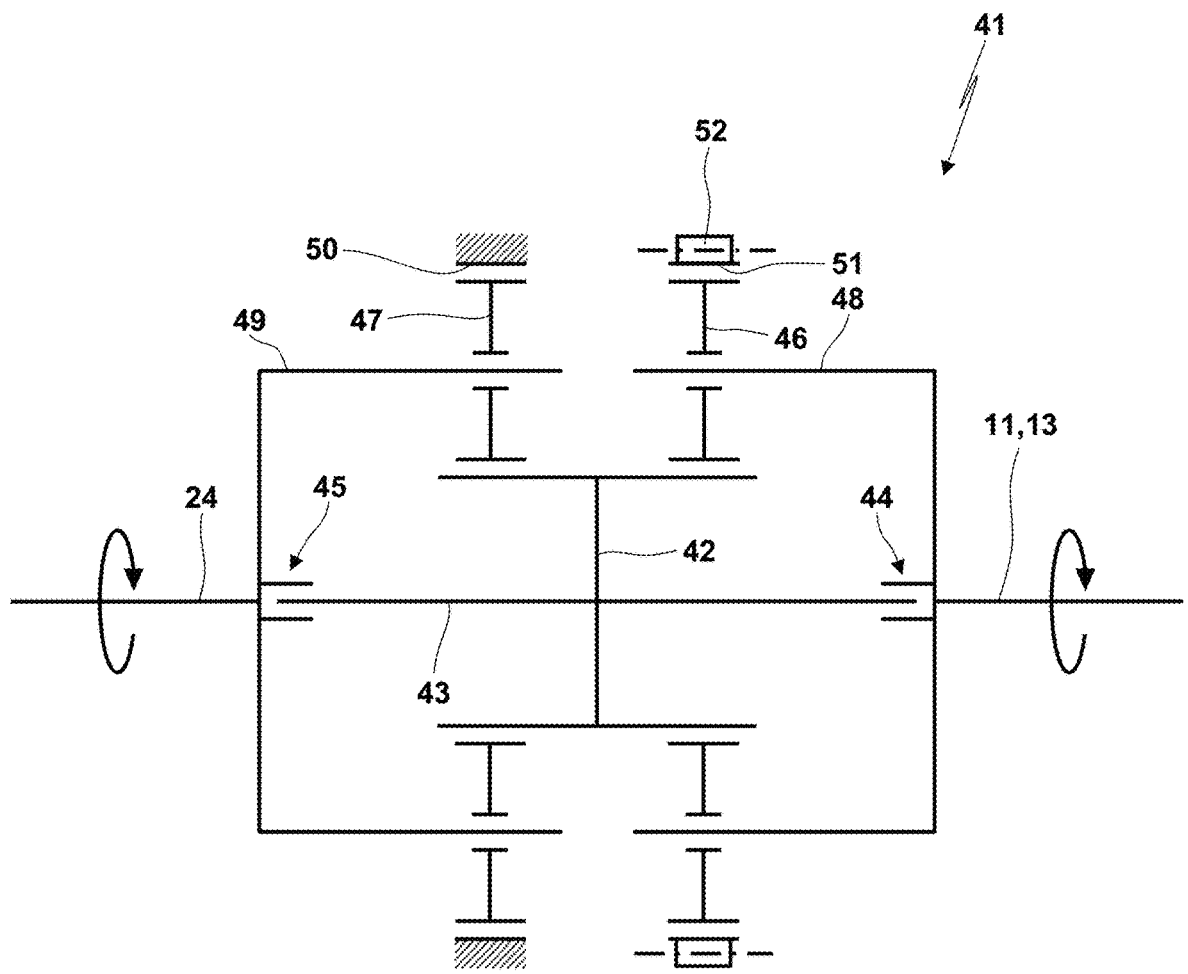
FIG. 5 schematically shows the planetary gear mechanism according to FIGS. 3 and 4.

For the embodiment according to FIG. 3, the level control valve 6 is realized as a sliding valve. In the housing 7 of the level control valve 6 an actuation element 24 is rotatably supported. This actuation element 24 comprises an eccentric or cam 25. Via a spring 26 the valve element 23, which here is a valve slider 27, is pressed against the eccentric or cam 25. Depending on the rotation angle of the actuation element 24, the eccentric 25 pushes the valve element 23 in a longitudinal direction of a bore 28 of the housing 7 forming a counter valve element 29. For the operating position shown in FIG. 3, a control edge 30 blocks the outlets 31, 32 of the ports 9, 10 into the bore 28, where between the outlet 31, 32 and the ports 9, 10 a throttle each is present. If the eccentric 25 is pivoted in such a way that the valve element 23 can move freely downwards, the control edge 30 of the valve element 23 clears the outlets 31, 32, in which way the ports 9, 10 are connected to a ring chamber 33 realized between the valve element 23 and the counter valve element 29. Together with the downward motion, the front face of the valve element 23 separates itself from a valve plate 36 pressed against a valve seat 35 of the housing 7 via a spring 34. In this way, a connection between the ring chamber 33 and a deaerated inner bore 37 of the valve element 23 is realized. In this way, the ports 9, 10 (and therefore the air suspension bellows 3 connected to them) can be deaerated via the throttle, the outlets 31 or 32, the ring chamber 33 and the deaerating inner bore 37. If, however, the eccentric 25 is rotated in such a way that the valve element 23 moves upwards from the position according to FIG. 3, the valve element 23 pushes the valve plate 36 away from the valve seat 35. This results in pressurized air present on the port 8 being able to reach the ports 9, 10 via a check valve 38, the transfer cross section between the valve plate 36 and the valve seat 35, the ring chamber 33 and the outlets 31, 32. In this way, the air suspension bellows 3 are aerated.

The relative position of the valve element 23, which here is the valve slider 27, possibly with the valve plate 36, and the counter valve element 29, which here is realized by the housing 7, therefore defines whether the air suspension bellows are aerated, deaerated or blocked:

In the first relative position 84 shown in FIG. 3, via the control edge 30 the ports 9, 10 leading to the air suspension bellows 3 are blocked. This first relative position has been reached when the valve element with the control edge 30 of the valve slider 27 is arranged at the level of the outlets 31, 32 of the counter valve element 29, which here is the housing 7.

When the valve element 23 is moved upwards from the position according to FIG. 3, a second relative position is reached, in which in order to aerate the spring bellows 3 the ports 9, 10 are connected to the port 8. In the second relative position, the valve element 23 is realized with the valve slider 27 and the valve plate 36, which are moved together. The aerating transfer cross section is then defined by the valve element 23 with the valve plate 36 and the counter valve element 29, which here is the valve seat 35. For the embodiment shown, the transfer cross section increases with an increasing upwards movement of the valve element 23.

Finally, the third relative position, in which the ports 9, 10 for the air suspension bellows 3 are deaerated, is reached when the valve element 23 with the control edge 30 has moved downwards away from the outlets 31, 32 and the front face of the valve element 23, which here is the valve slider 27, has also moved away from the valve plate 36, which here is an unmovable part of the counter valve element 29. The deaerating inner bore 37 is connected to the port 39 in order to enable deaeration in a way not shown. For the embodiment shown, the deaerating cross section between the front face of the valve element 23 and the valve plate 36 increases with an increasing downward movement of the valve element 23.

If there is an electronic control of the level outside the level control valve 6, e.g. according to FIGS. 1 and 2, the actuation element 24 may be rotationally fixed or realized as one piece with the driveshaft 11. Contrary to this, according to FIG. 3 the electronic level control is achieved by changing the relative rotation angle between the driveshaft 11, to which the coupling mechanism 12 is linked, and the actuation element 24. In order to achieve this, the actuation element 24 and the driveshaft 11 are also rotatable around a common rotation axis 40. Between the driveshaft 11 and the actuation element 24, a planetary gear mechanism 41 is interconnected. The realization of the planetary gear mechanism 41 is shown schematically in FIG. 5. The planetary gear mechanism 41 comprises a sun wheel 42 supported rotatably via a sun wheel shaft 43 in bearings 44, 45 within the driveshaft 11 and the actuation element 24. Here, the sun wheel 42 as a double sun wheel is equipped with two sun wheel gear toothings having the same diameters, which mesh with planet wheels 46, 47 arranged in parallel planes. A bar 48 supporting the planet wheel 46 is rotated along with the driveshaft 11. Correspondingly, a bar 49 supporting the planet wheel 47 is rotated along with the actuation element 24. The planet wheel 47 radially outwardly meshes with a housing-fixed internal wheel 50, while the planet wheel 46 meshes with an internal wheel 51 which is rotatable via a drive aggregate 54. In order to achieve this, the internal wheel 51 comprises an outer gear toothing 52, e.g. a worm gear toothing, via which the internal wheel 51 may be driven in both directions of rotation by a driveshaft 53, which here is a worm shaft, by the drive aggregate 54, which here is an electro-motor.

The level control valve 6 functions as follows:

Without the internal wheel 51 being rotated by the drive aggregate 54, the planetary gear mechanism 41 rigidly couples the driveshaft 11 to the actuation element 24, so that a conventional mechanical level control is performed. On the contrary, by rotating the internal wheel 51 a change of the relative rotation angle of the driveshaft 11 with respect to the actuation element 24 can be induced so that depending on the electronic control of the drive aggregate 54 and depending on the resulting rotation of the internal wheel 51 the reference level can be changed and/or purposely a first, second or third relative position between the valve element 23 and the counter valve element 29 can be induced. For this embodiment, the driveshaft 11 forms the drive element 13.

According to FIG. 3, sensors 55, 56 are integrated into the level control valve 6, which here are realized as Hall sensors. The sensor 55 senses the rotation angle of the drive element 13, while the sensor 56 senses the rotation angle of the actuation element 24. For realizing the sensors 55, 56 as Hall sensors, the drive element 13 and the actuation element 24 in the region of their outer surface comprise a permanent magnet which is guided as shown closely along the receiver of the sensor 55, 56.

For the embodiment shown, the sensors 55, 56 are connected to a circuit board 57 or even supported by the circuit board 57, which is preferably also responsible for controlling the drive aggregate 54 and analyzing the signals of the sensors 55, 56. In this case, the level control valve 6 also comprises an electric port, especially for a connection to a data bus, the connection to further control units and/or an electric power supply.

Figure 6:
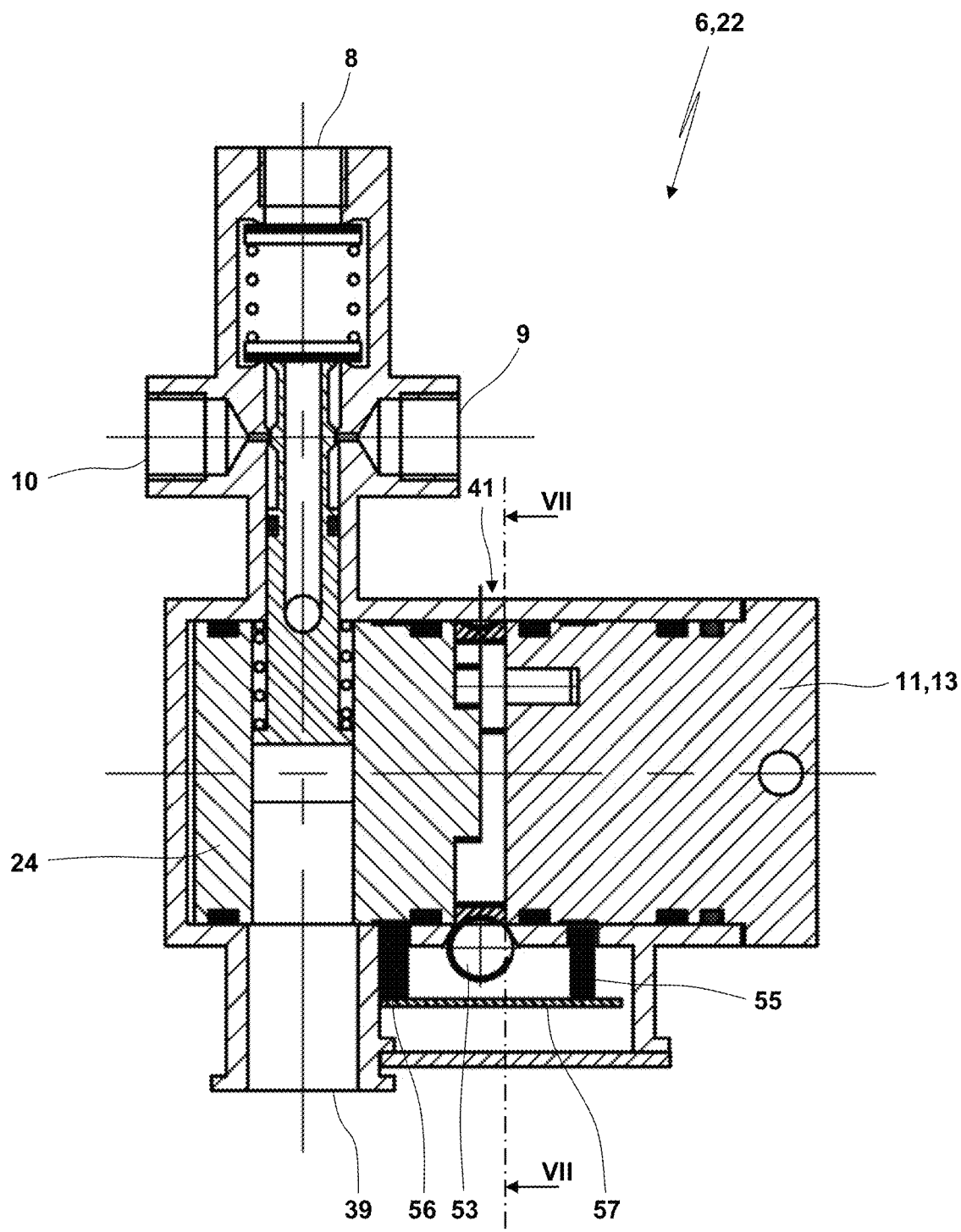
FIG. 6 schematically shows another embodiment of a level control valve with an actuator comprising a planetary gear mechanism.
Figure 7:
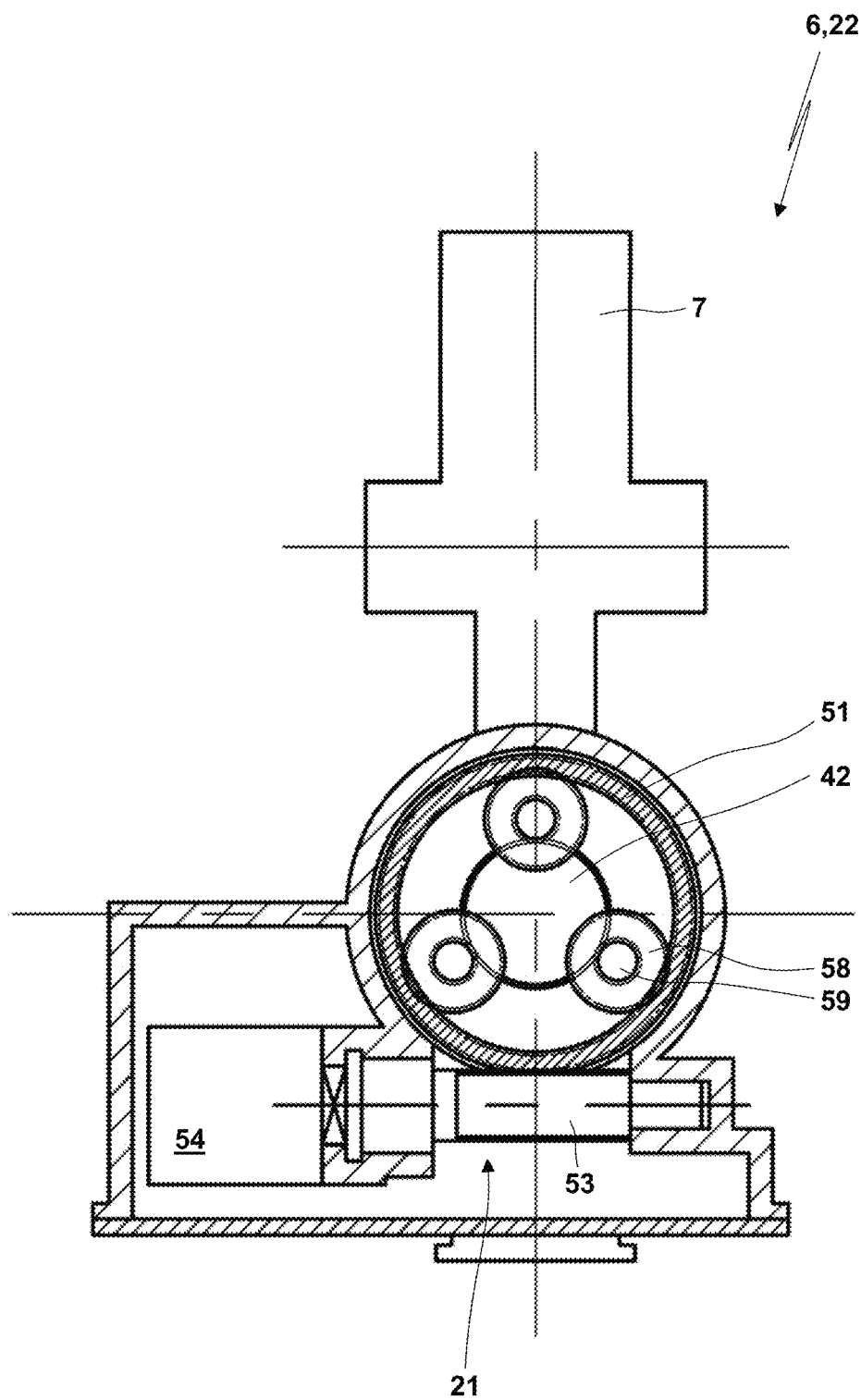
FIG. 7 shows a section VII of the level control valve according to FIG. 6.
Figure 8:
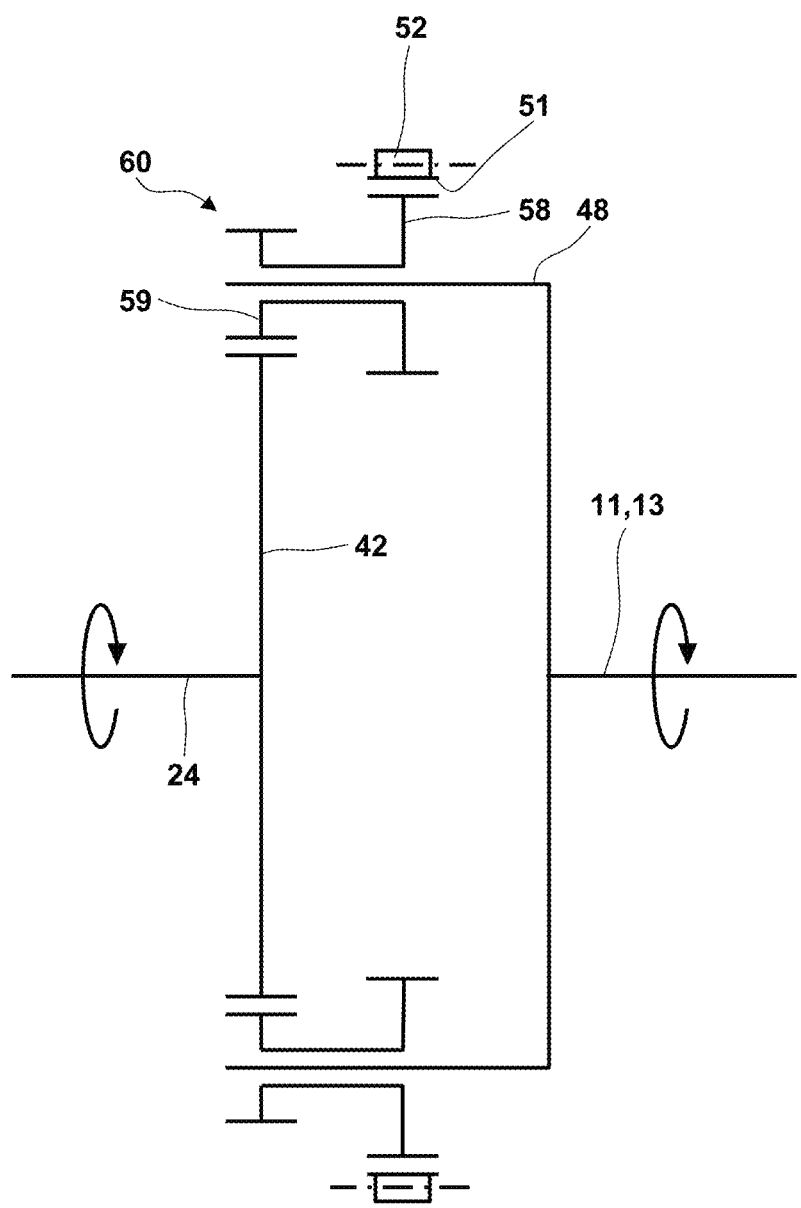
FIG. 8 schematically shows the planetary gear mechanism according to FIGS. 6 and 7.

FIGS. 6 and 7 show a level control valve 6 in which (with an embodiment which, apart from that, corresponds to FIGS. 3 to 6) another planetary gear mechanism 41, shown schematically in FIG. 8, is interconnected between the drive element 13 and the actuation element 24: A double planet 60 comprising two planet wheels 58, 59 is supported rotatably relative to the bar 48, which is rotated together with the drive element 13. The planet wheel 58 only meshes radially outwardly with the internal wheel 51 which comprises the gear toothing 52 and is driven by the drive aggregate 54. The planet wheel 59, on the contrary, meshes exclusively radially inwardly with the sun wheel 42, which in this case is connected rotatably fixedly to the actuation element 24. By a suitable choice of the radius of the bar 48 and the planet wheels 58, 59, the transmission ratio between the drive element 13 and the actuation element 24 can be chosen. Here, it is also possible that the drive element 13 and the actuation element 24 are rotated by the same angle. Here, too, by actuation of the actuator 21 the reference level can be changed.

Figure 9:
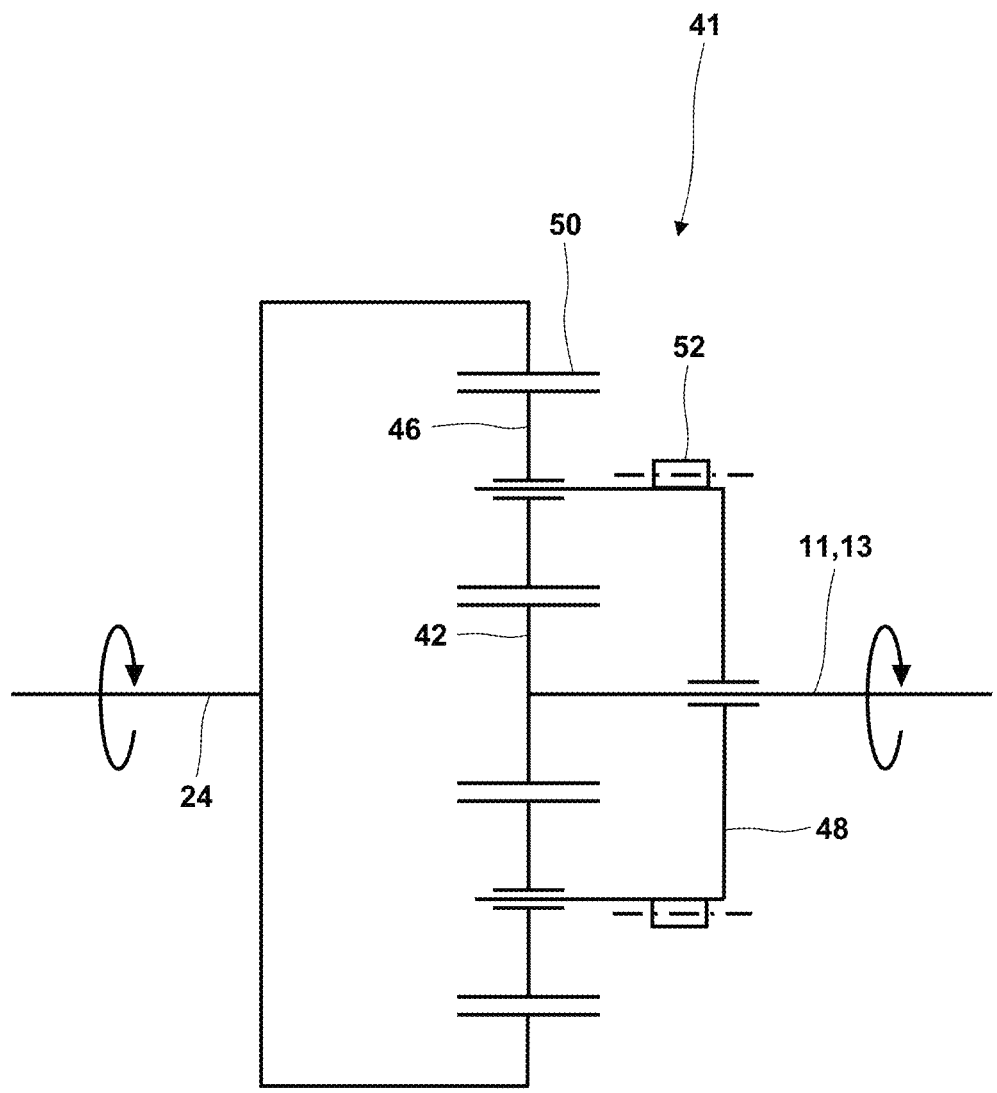
FIG. 9 schematically shows another embodiment of a planetary gear mechanism usable in an actuator.

FIG. 9 schematically shows a further planetary gear mechanism 41 which can be employed between a drive element 13 and an actuation element 24. The drive element 13 directly drives the sun wheel 42. The actuation element 24 is rigidly connected to the internal wheel 50. The only planet wheel 46 (or a corresponding set of planet wheels) radially outwardly meshes with the internal wheel 50 and radially inwardly meshes with the sun wheel 42. Without electronic control, the bar 48 supporting the planet wheel 46 is held by the drive aggregate 54, while when an electronic control is applied and the drive aggregate 54 is driven it can be rotated.

Figure 10:
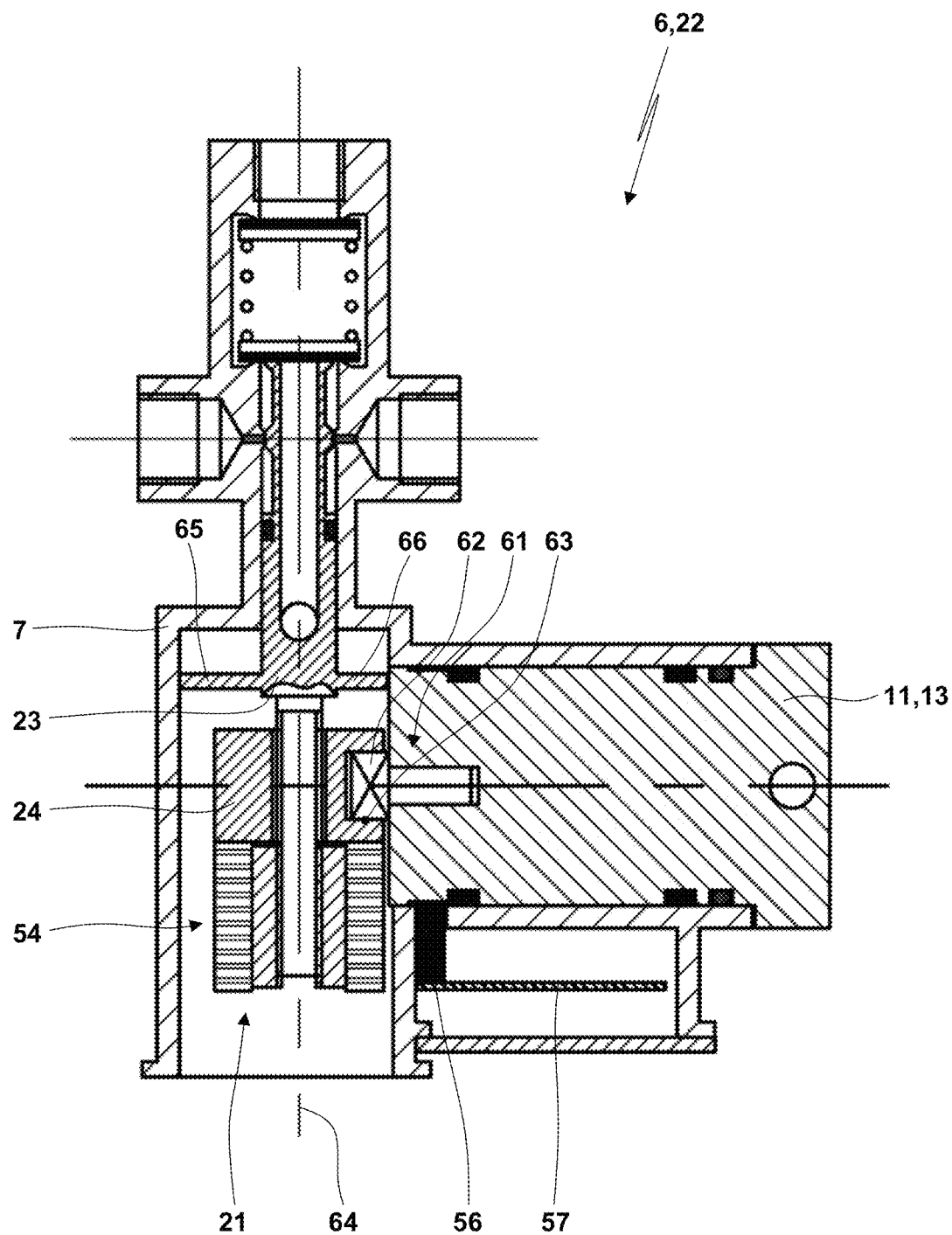
FIGS. 10 and 11 show further embodiments of a level control valve.

FIG. 10 shows a modified embodiment of the level control valve 6, in which the rotation of the driveshaft 11 is converted into a translational movement of the actuation element 24 via a drive connection 61. The drive connection 61 comprises an eccentric 62 that is rotated with the driveshaft 11. The eccentric 62 engages with an opening or groove 63 of the actuation element 24. In this way the rotation of the eccentric 62 may induce the translational movement of the actuation element 24. In this case, the actuator 21 is effective between the actuation element 24 and the valve element 23. The actuator 21 creates a longitudinal shift or an "extension and retraction" of the valve element 23 out of the actuation element 24. For example, the actuator is realized as a spindle drive, axial step motor or similar, driven by a drive aggregate 54. Here, a rotation of the actuation element 24 in the housing 7 of the level control valve 6 is avoided by an eccentric arrangement of the actuation axis 64 for the translational movement of the actuation element 24 and the extension and retraction of the valve element 23 out of the actuation element 24 by the actuator 21 and by eccentric support of the valve element 23 via support wings 65, 66.

Figure 11:
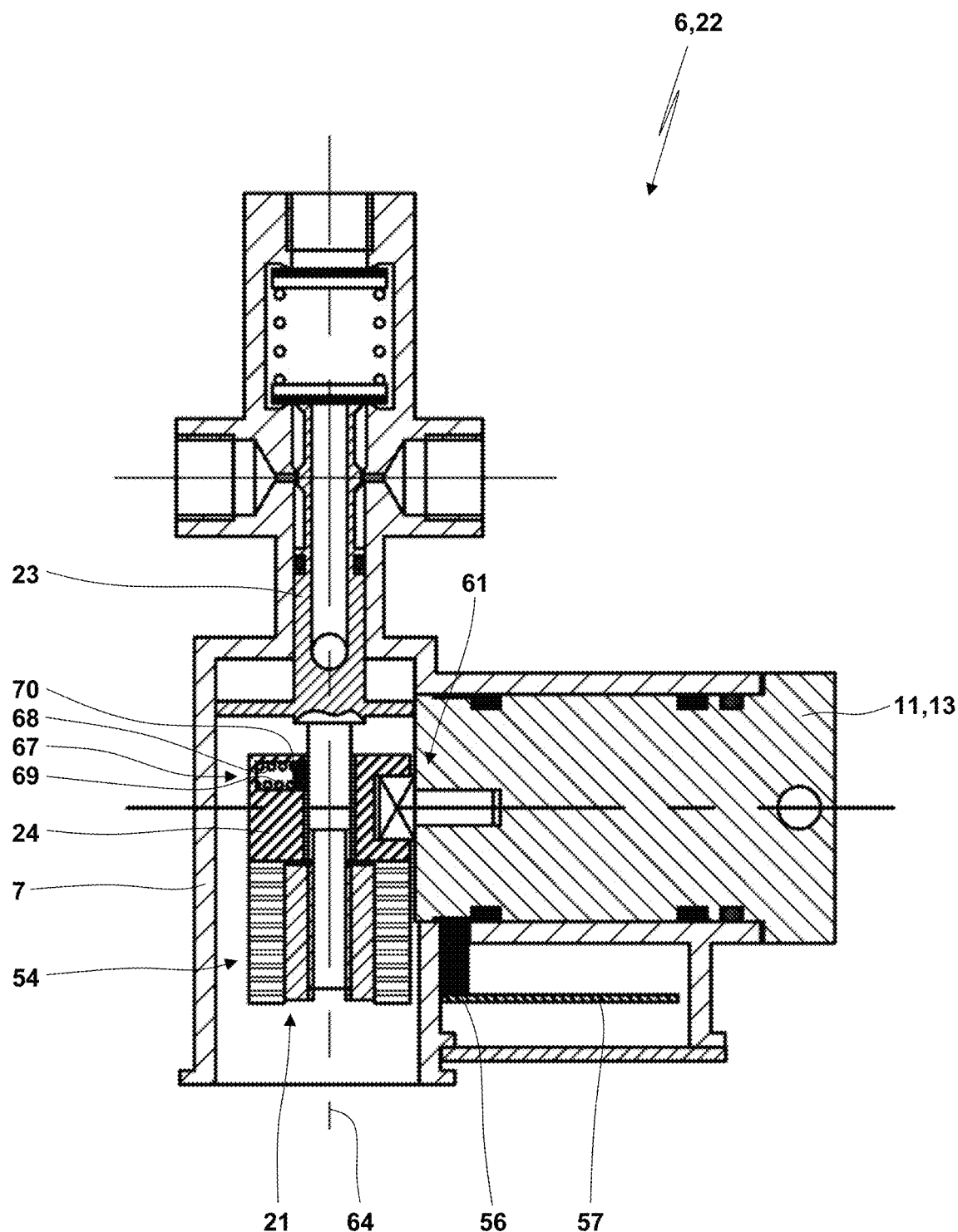

According to FIG. 11 (being an embodiment that otherwise corresponds to FIG. 10) a friction element 67 is integrated into the actuation element 24, which increases the friction in the power flow between the drive element 13, actuator 21 and valve element 23 in such a way that due to self-blocking an undesired displacement of the valve element 23 from a position of the valve element 23 once induced does not occur, even if there is no current applied to the drive aggregate 54. For the embodiment shown, the actuation element 24 comprises a blind bore 68 starting from the longitudinal bore accommodating the valve element 23. On the floor of the blind bore 68 a spring base of a spring 69 is supported. The spring 69 is pre-tensioned and with its other spring base presses a friction element 70, e.g. made of rubber, against the outer surface of the valve element 23 in order to increase friction.

Figure 12:
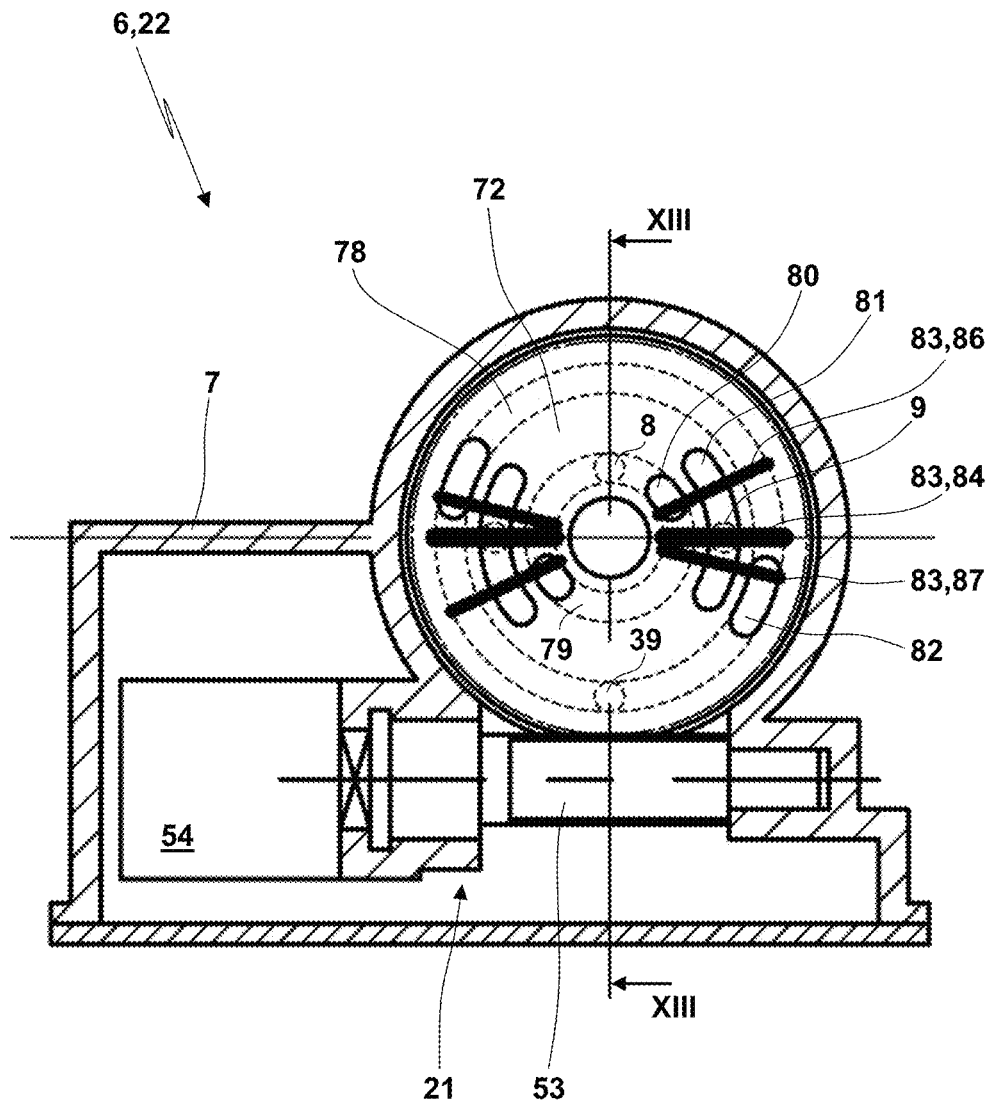
FIG. 12 in a section XII-XII schematically shows a level control valve in a disc mode of construction.
Figure 13:
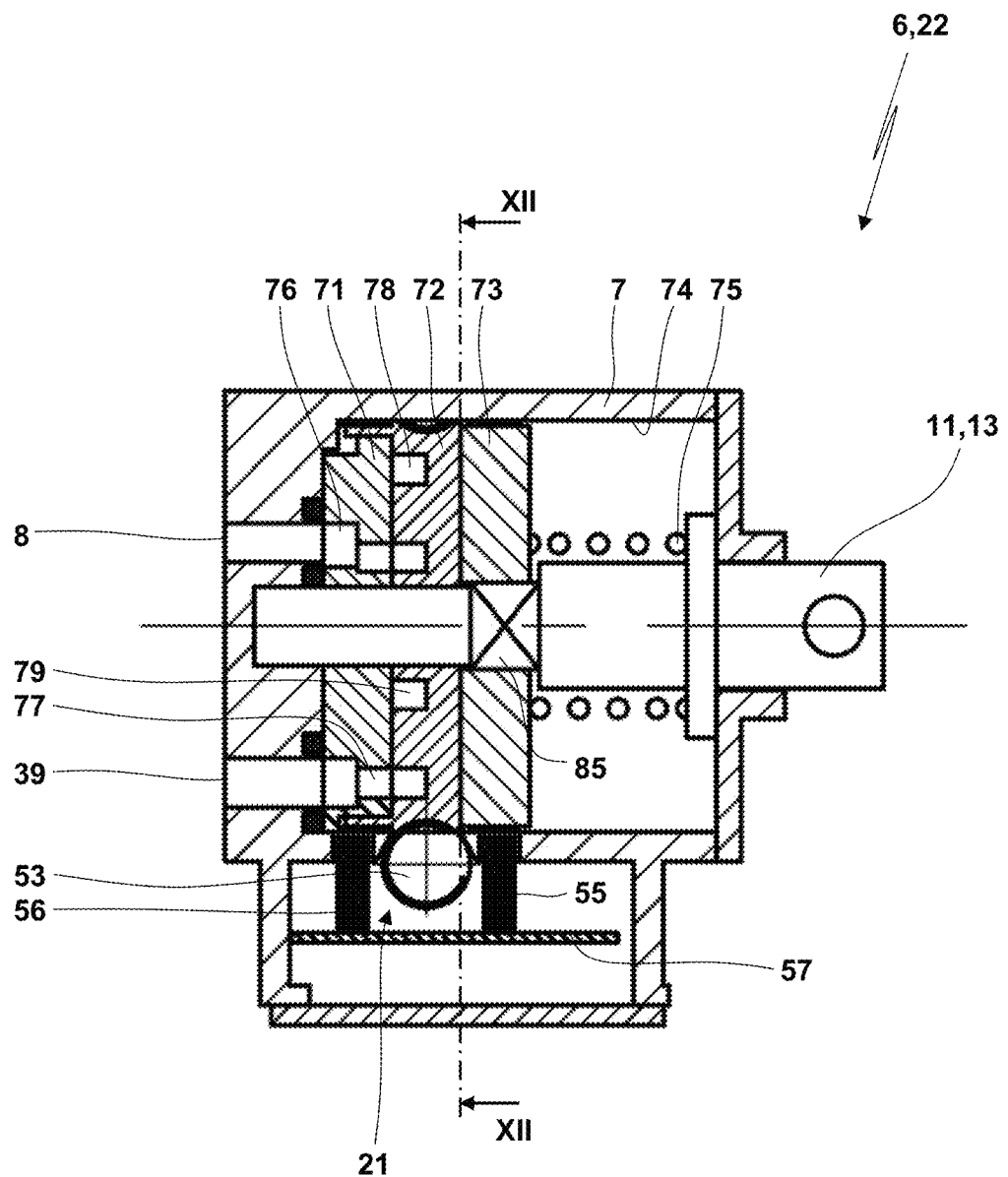
FIG. 13 shows the level control valve according to FIG. 12 in a longitudinal section XIII-XIII.

FIGS. 12 and 13 show a level control valve in a disc mode of construction. With respect to the general realization of a level control valve in a disc mode construction reference is made to the relevant prior art. Here, the level control valve 6 comprises three valve discs 71, 72, 73. The valve discs 71, 72, 73 are inserted in this sequence into a bore 74 of the housing 7. The valve discs 71, 72, 73 are pressed against the floor of the bore 74 by a spring 75 while sealing with respect to one another (apart from the desired transition cross sections and channels). For this purpose, additionally sealing elements not shown here may be effective between the valve discs 71, 72, 73. The valve disc 71 is stationarily and non-rotatably arranged in the housing 7 and provides transmission channels 76, 77, here in the shape of stepped offset through bores of the valve discs 71 for connection to the ports 8, 39. The central valve discs 72 may be rotated via the actuator 21. For the embodiment shown, the actuator 21 (as for the previous embodiments) comprises a driveshaft 53, especially a worm shaft, and a drive aggregate 54. The driveshaft 53 meshes with an outer gear toothing of the valve discs 72. On its side turned towards the valve disc 71, the valve disc 72 comprises circumferential channels 78, 79 continuous in the circumferential direction, which are embodied as circumferential grooves and into which the transmission channels 76, 77 lead as shown. According to FIG. 12, the valve disc 72 comprises continuous elongated holes 80, 81, 82, which extend in a partial circumference with different extensions and are arranged concentrically with respect to one another. The elongated hole 80 here extends from a 01:30 o'clock position to a 02:45 o'clock position. The elongated hole 81 extends from a 01:30 o'clock position to a 04:15 o'clock position. The elongated hole 82 extends from a 03:15 o'clock position to a 04:15 o'clock position. The elongated hole 81 independently of the rotation angle of the valve discs 71, 72, 73 is permanently in pneumatic connection with the port 9 for the air suspension bellow 3, which may be achieved through suitable channels and grooves of the valve disc 71. The elongated hole 80 is in permanent connection to the port 8 via the circumferential channel 79, while the elongated hole 82 is permanently in pneumatic connection with the port 39 via the circumferential channel 78. On the side turned towards the valve disc 72, the valve disc 73 comprises a transmission channel 83 embodied as a radial groove. With the black lines in FIG. 12, the transmission channel 83 is schematically shown for different rotation angles of the valve disc 73 in FIG. 12. In this first relative position 84 between the valve discs 72, 73, the transmission channel 83 is pneumatically connected to the elongated hole 81, but not to the elongated holes 80, 82. In this way, the port 9 for the air suspension bellow 3 is blocked via the contact between the valve discs 72, 73. The valve disc 73 is rotationally fixed, here via a four-cornered shaft 85, but axially slidably connected to the drive element 13 or driveshaft 11. Decreasing the level 5 leads to the valve disc 73 pivoting via the drive element 13 in a counterclockwise direction towards the second relative position 86 (cp. FIG. 12). In this second relative position 86, the transmission channel 83 connects the elongated holes 80, 81 to one another, while there is no connection to the elongated hole 82. In this second relative position 86, therefore there is a connection of the port 9 to the port 8, so that the air suspension bellow 3 can be aerated. On the contrary, an increase in the level 5 leads to a pivoting of the valve disc 73 in a clockwise direction towards the third relative position 87. In the third relative position 87, the transmission channel 83 connects the elongated holes 81, 82 to one another without there being a connection to the elongated hole 80. Therefore, in the third relative position 87 the port 39 is connected to the port 9, in which way the air suspension bellow 3 is deaerated. As described before, by means of the level control valve 6 a conventional mechanical level control can be carried out, especially via a mechanical coupling mechanism 12. Additionally, by rotation of the valve disc 72 by means of the actuator 21 a reference level can be changed and/or a dynamic level control by an electronic control may be achieved. It is possible that, as shown in FIG. 12, further elongated holes corresponding to the elongated holes 80, 81, 82 are provided on the valve disc 72 and a further transmission channel 83 is provided on the valve disc 73 in order to enable level control for a two-circuit air suspension system.

For this embodiment, when there is electronic level control the mechanical transmission path from the vehicle wheel 1 or the vehicle axle 2 to the valve element 23, which here is realized by the valve disc 73, is not interfered with. Rather than that, a mechanical coupling mechanism 12 that is not electronically adjustable is employed. Rather than that, for this embodiment the counter valve element 29, which here is realized by the valve disc 72, is displaced electronically.

Correspondingly, in an embodiment wherein the level control valve 6 is a sliding valve (cp. FIG. 3), it is possible to induce the mechanical level control via the movement of the valve element 23, while the counter valve element 29 in this case is not the housing 7 but, rather than that, a sleeve slidably supported with respect to the housing, which then may form control edges or limits transmission cross sections and which may be shifted via the actuator 21 in order to achieve an electronic level control.

Figure 14:
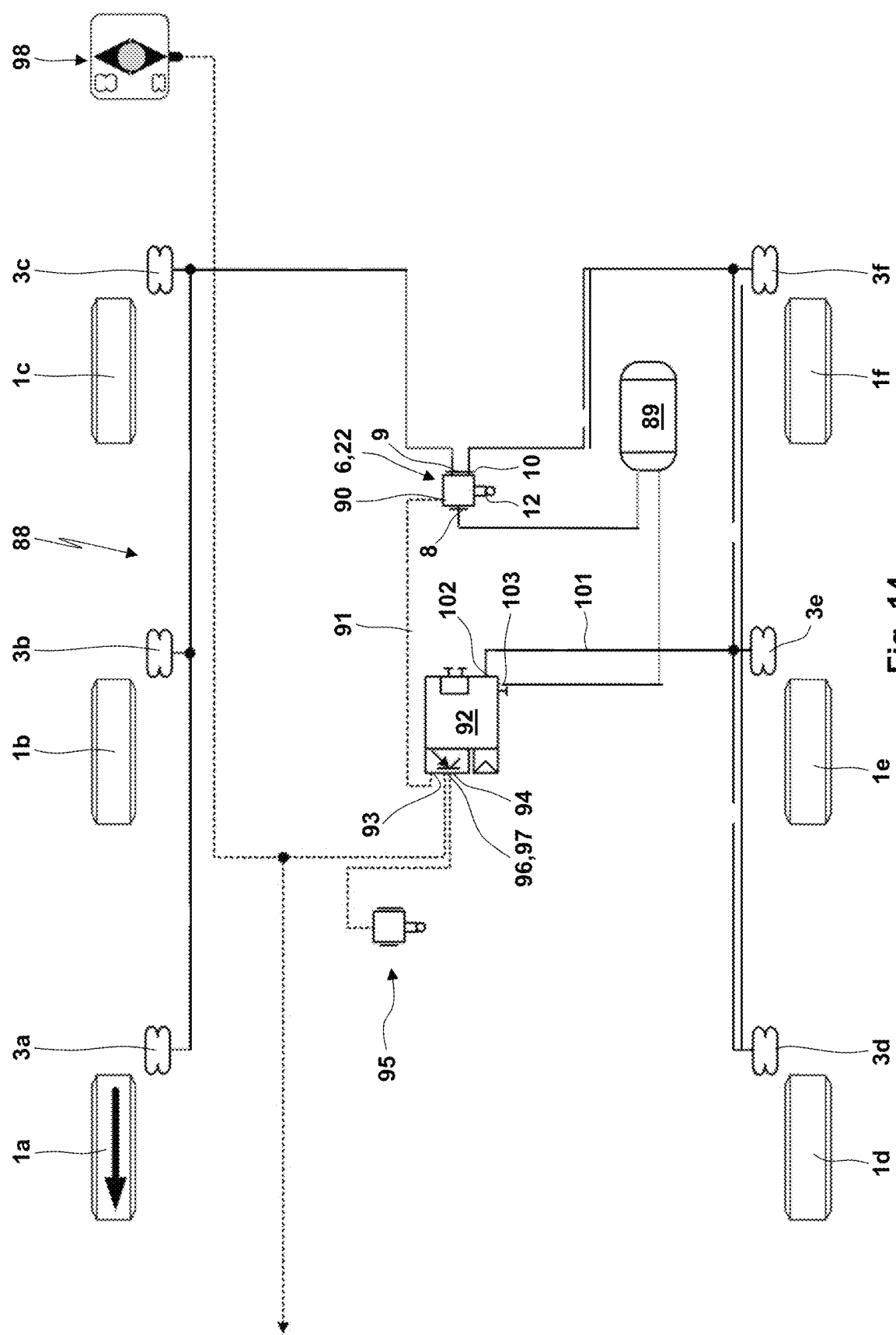
FIGS. 14 to 21 schematically show different embodiments of a control circuit for an air suspension system of a commercial vehicle with a control device and a level control valve device controlled by the control device.

FIG. 14 shows the integration of a level control valve device 22, especially a level control valve 6, into an electropneumatic control circuit 88 for an air suspension device of a commercial vehicle. The coupling mechanism 12 is only shown schematically. The port 9 is here connected to air suspension bellows 3a, 3b, 3c of the right vehicle side, with the air suspension bellows 3a, 3b, 3c being connected in series, while the port 10 is correspondingly connected to air suspension bellows 3d, 3e, 3f of the left vehicle side. Pressurized air from a reservoir 89 is supplied to the port 8. The air suspension bellows 3a-3f are each assigned to a vehicle wheel 1a-1f or to vehicle axles corresponding to the vehicle wheels 1a-1f. The level control valve device 22 or the level control valve 6 comprises an electric port 90. Here, a control line 91 is connected to the port 90. Via the control line 91 a control signal for controlling the actuator 21 is transmitted to the level control valve device 22. The control signal is generated by an electronic control device 92, which comprises a control outlet 93, to which the control line 91 is connected and via which the control signal is transmitted to the level control valve device 22. The electronic control device 92 may be an ABS control unit or EBS control unit without this necessarily having to be the case. The electronic control device 92 may be realized as an integral singular construction unit, as a modular construction unit or as a distributed construction unit with several control unit parts. The control device 92 furthermore comprises an inlet port 94. A level signal is supplied to the control device 92 via the inlet port 94. For the embodiment according to FIG. 14, this leveling signal originates from a conventional level control valve 95 which for example is assigned to one of the three axles and into which a level sensor may be integrated. Alternatively, the inlet port 94 may be connected to another level sensor, which at any one of the vehicle axles determines the level of the vehicle axle and/or the vehicle wheel. Via a further control inlet 96 or an interface 97, the control device 92 is connected to an operating element 98. Via the operating element 98, an operator can manually and intentionally induce a level change or set a reference level, induce a preset ramp level or induce lifting or lowering. The operating element 98 may be realized in any way as far as it is possible to create an electric signal which transmits the demand of the user to the control device 92. To mention only some non-limiting examples, the operating element 98 may comprise at least one switch, at least one pivotable lever, at least one translationally movable actuation element or similar, the actuation of which correlates with the demand of the user and generates a corresponding input signal for the control device 92. It is, for example, also possible that the operating element 98 is realized and actuated corresponding to the document WO 2014/124944 A1, the document being incorporated into the present patent application. If there is an electric power supply, via the operating element 98 the level 5 can be influenced or a reference level can be changed by the user. The control device 92 converts the signals given by the user via the operating element 98 into a suitable control of the actuator 21. If, for example, at a ramp a desired reference level corresponding to the height of the ramp is defined via the operating element 98, via the mechanical coupling mechanism 12 a mechanical level control can be carried out. During the mechanical level control, the changed reference level given via the operating element 98 is maintained, even in the event of a lack of electric power supply during a loading or unloading.

Figure 15:
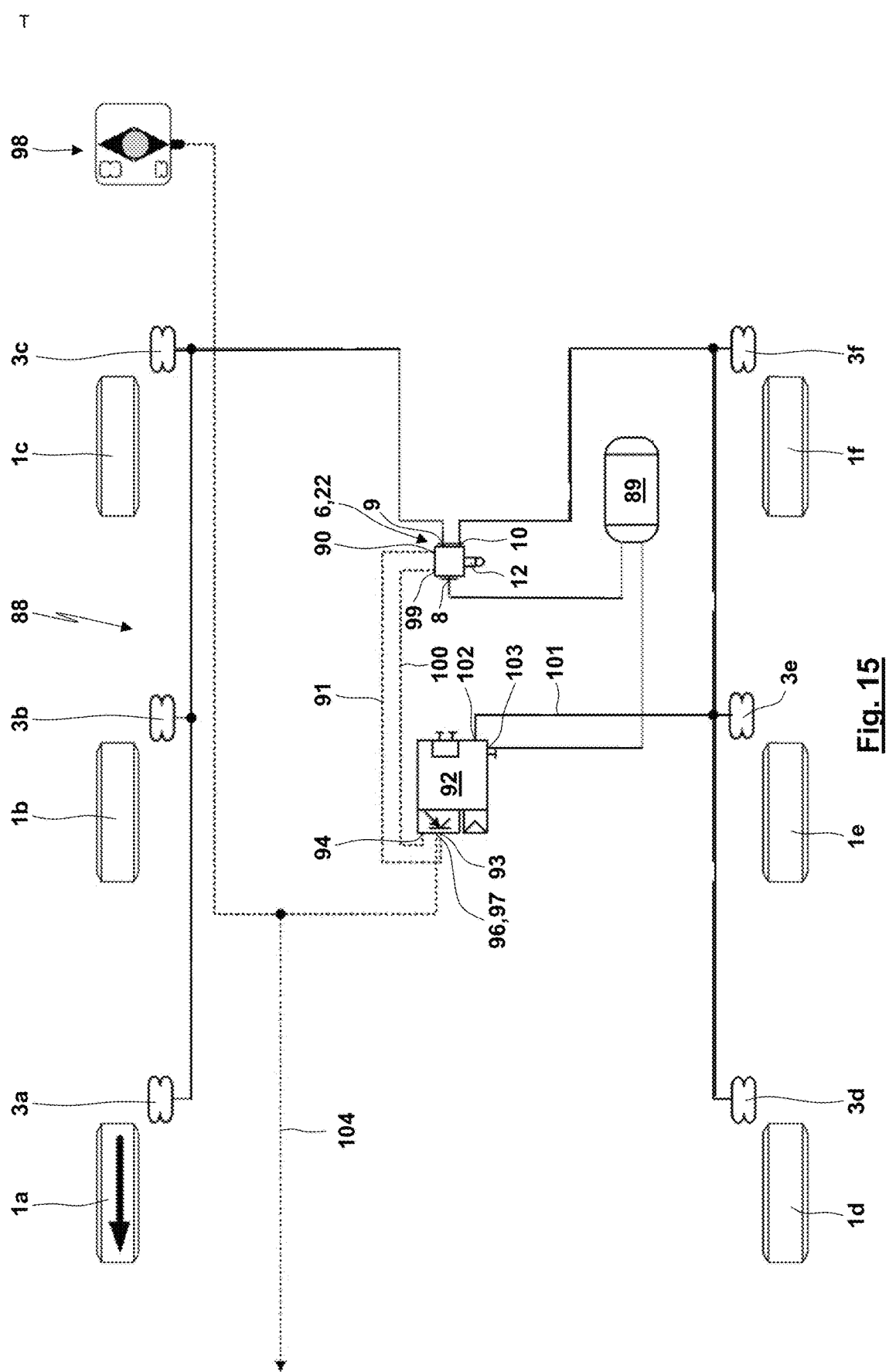

With the construction and function otherwise corresponding generally to the embodiment according to FIG. 14, according to FIG. 15 instead of an external level sensor the signal of a sensor integrated into the level control valve device 22, especially a sensor 55, 56 is used by the control device 92. In this case, the level control valve device 22 comprises an outlet 99 for the signal of the sensor which is then supplied to the inlet port 94 of the control device 92 via a signal line 100.

For the embodiment according to FIGS. 14 and 15, air suspension bellows 3d, 3e, 3f of one vehicle side are connected to a pneumatic port 102 of the control device 92 via a pressure signal line 101. In the control device 92, a pressure sensor may be present which senses the pressure on the port 102. In this way then in the control device 92 the pressure in the air suspension bellows 3d, 3e, 3f is also known and can be used for control (closed-loop or open-loop). Additionally, the control device 92 may comprise a port 103 to which the reservoir 89 is connected. Via a pressure sensor integrated into the control device 92, the pressure in the reservoir 89 can be sensed and taken into account by the (closed-loop or open-loop) control of the control device 92. It is possible that the operating element 98 communicates with the interface 97 of the control device 92 via a bus system 104. Here, via the bus system 104 other operating measures such as e.g. a steering angle, a vehicle speed, a gear, a geodetic position and similar can be transmitted to the control device 92. It is also possible that the control device 92 transmits operating parameters such as e.g. a pressure in an air suspension bellow and/or the reservoir, a level 5 and similar to other control devices via the bus system 104.

Figure 16:
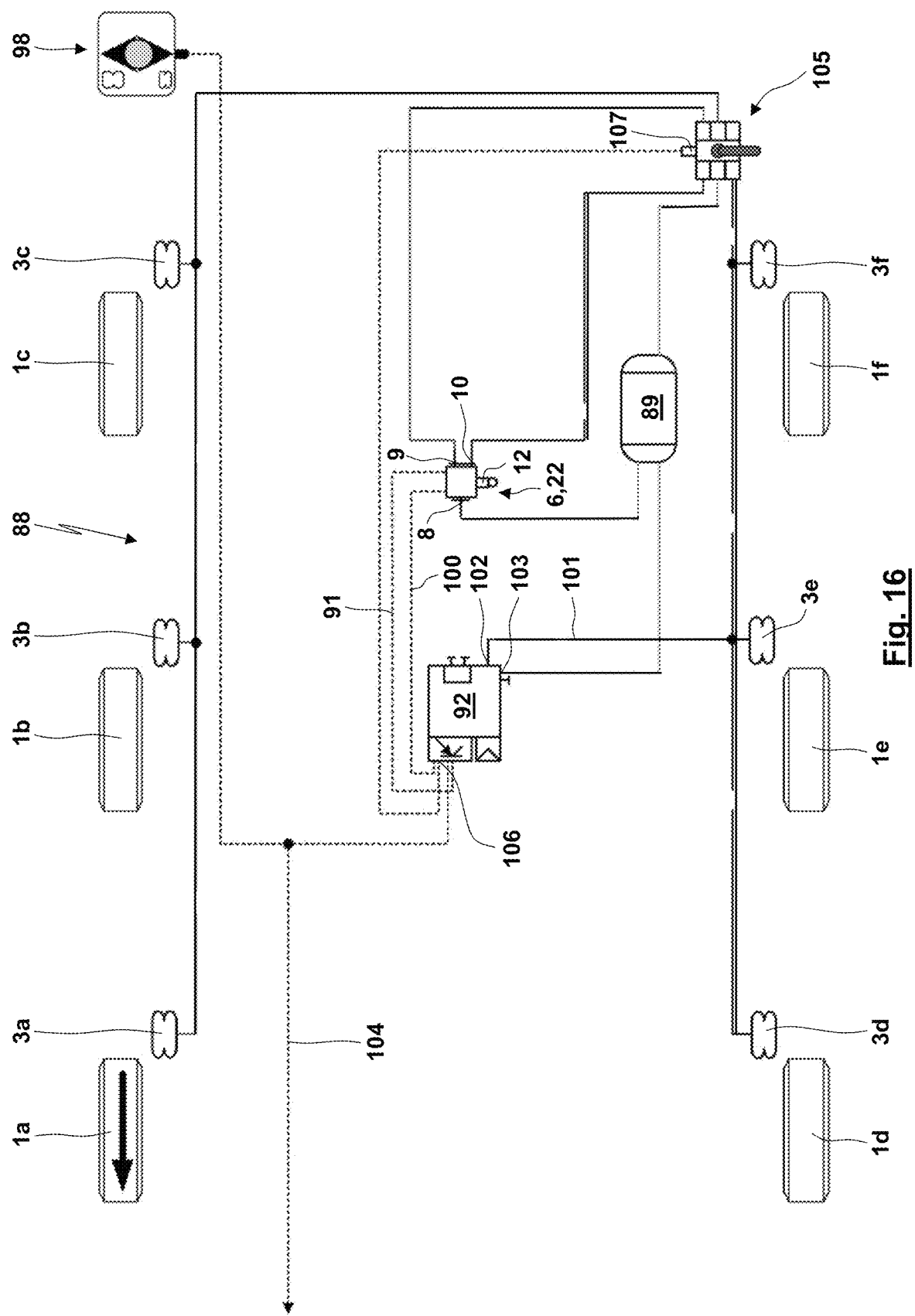

FIG. 16 shows an embodiment in which the level control valve device 22 is connected to the air suspension bellows 3*a*-3*f* of both sides of the vehicle via a conventional lifting-lowering selector valve 105 such as this is e.g. sold by the Haldex Brake Products GmbH company under the "COLAS" label or by the competitor WABCO GmbH under the "TASC" label. While it is generally possible for such a lifting-lowering selector valve 105 to be arranged upstream of the level control valve device 22 between the reservoir 89 and the level control valve device 22, here the lifting-lowering selector valve 105 is arranged downstream of the level control valve device 22. In addition to the possibility of changing the level 5 according to FIGS. 14 and 15, based on a possibly dynamic level control by means of the control device 92 based on a demand given by the user via the operating element 98 as well as purely mechanically based via the coupling mechanism 12, accordingly a level change, especially at a ramp, can also be induced with the lifting-lowering selector valve 105. However, it is possibly disadvantageous in this case that a level once given by the driver via the lifting-lowering selector valve 105 is re-adjusted neither when electric power supply is present nor when electric power supply is not present if the vehicle is being loaded or unloaded. It is also possible in this case that the control device 92 comprises a further control outlet 106 which is connected to a control inlet 107 of the lifting-lowering selector valve 105. In this case, the control device 92 also generates a so-called reset-to-ride signal in case it is recognized from the driving speed sensor, the actuation of a gear, the actuation of a brake pedal, the actuation of a brake light switch or similar that a drive operation is commenced. This reset-to-ride signal is transmitted to the control inlet 107 of the lifting-lowering selector valve 105 via the control outlet 106 of the valve device 92. In this way then the lifting-lowering selector valve 105 is transferred from a lifting, lowering and/or stop position into a drive position in which the level control is provided via the level control valve device 22, even if the user has forgotten to move the lifting-lowering selector valve 105 back into the drive position by manual actuation of the same. With regard to prior art pertaining to the lifting-lowering selector valve 105 and the reset-to-ride function in an exemplary manner reference is made to the documents EP 1 712 380 B1, EP 2 067 638 B1, EP 0 520 147 B1 and EP 0 520 148 B1. A latching or locking of a lifting position and/or lowering position of the lifting-lowering selector valve 105 is also possible together with the release with a release signal or reset-to-ride signal of the control device 92. The additional lifting-lowering selector valve 105, on the other hand, enables a manual level change if no electric power supply should be present.

Figure 17:
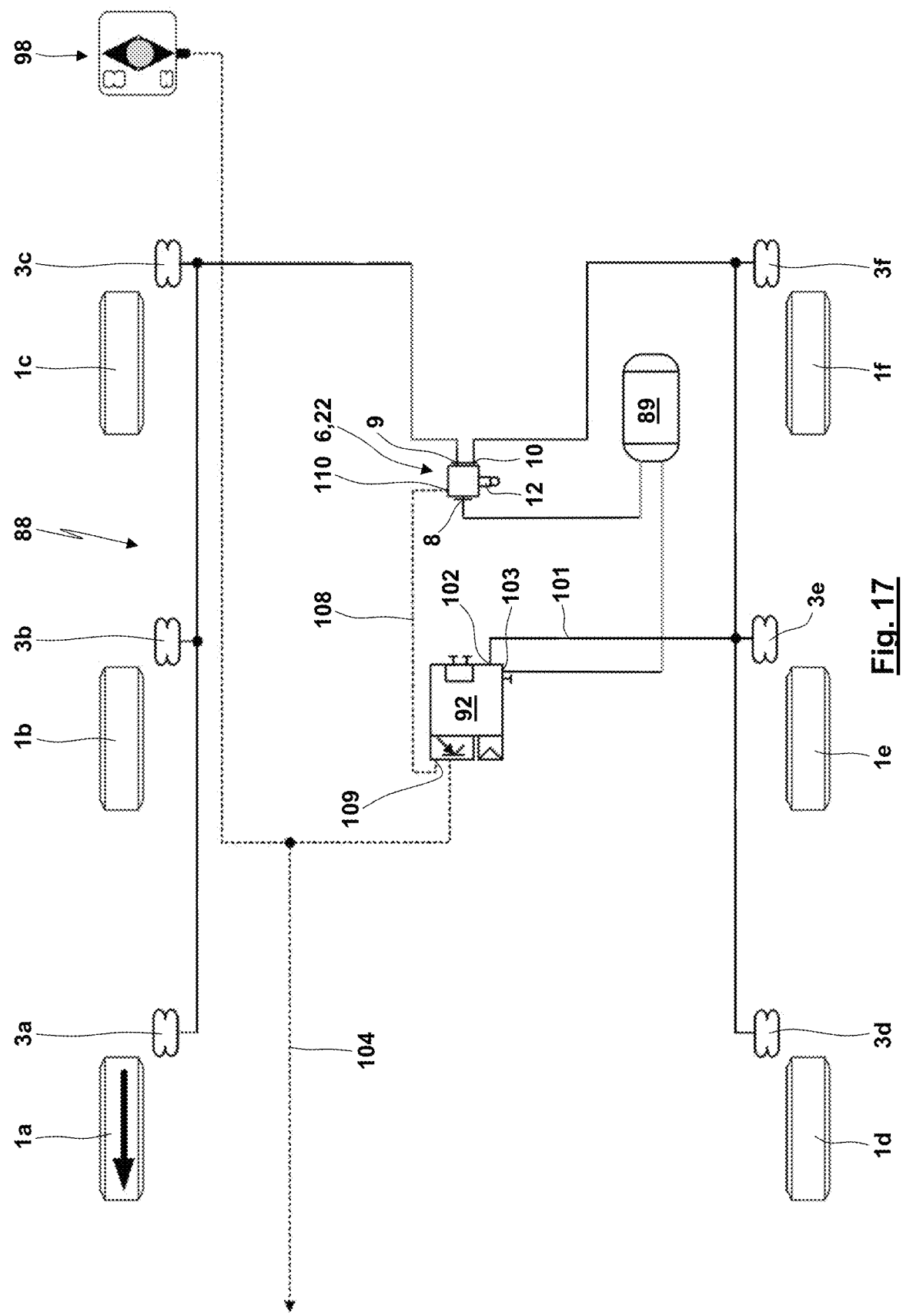

For the embodiment according to FIG. 17, a bidirectional line 108 is employed. Via bidirectional ports 109, 110 the bidirectional line 108 is connected in one end portion to the control device 92 and in the other end portion to the level control valve device 22. Via the bidirectional line 108 on the one hand a level signal can be transferred from the level control valve device 22 to the control device 92 of the level control valve device 22 to the control device 92 and on the other hand via the bidirectional line 108 the control signal can be transmitted from the control device 92 to the level control valve device 22 in order to control the actuator 21.

Figure 18:
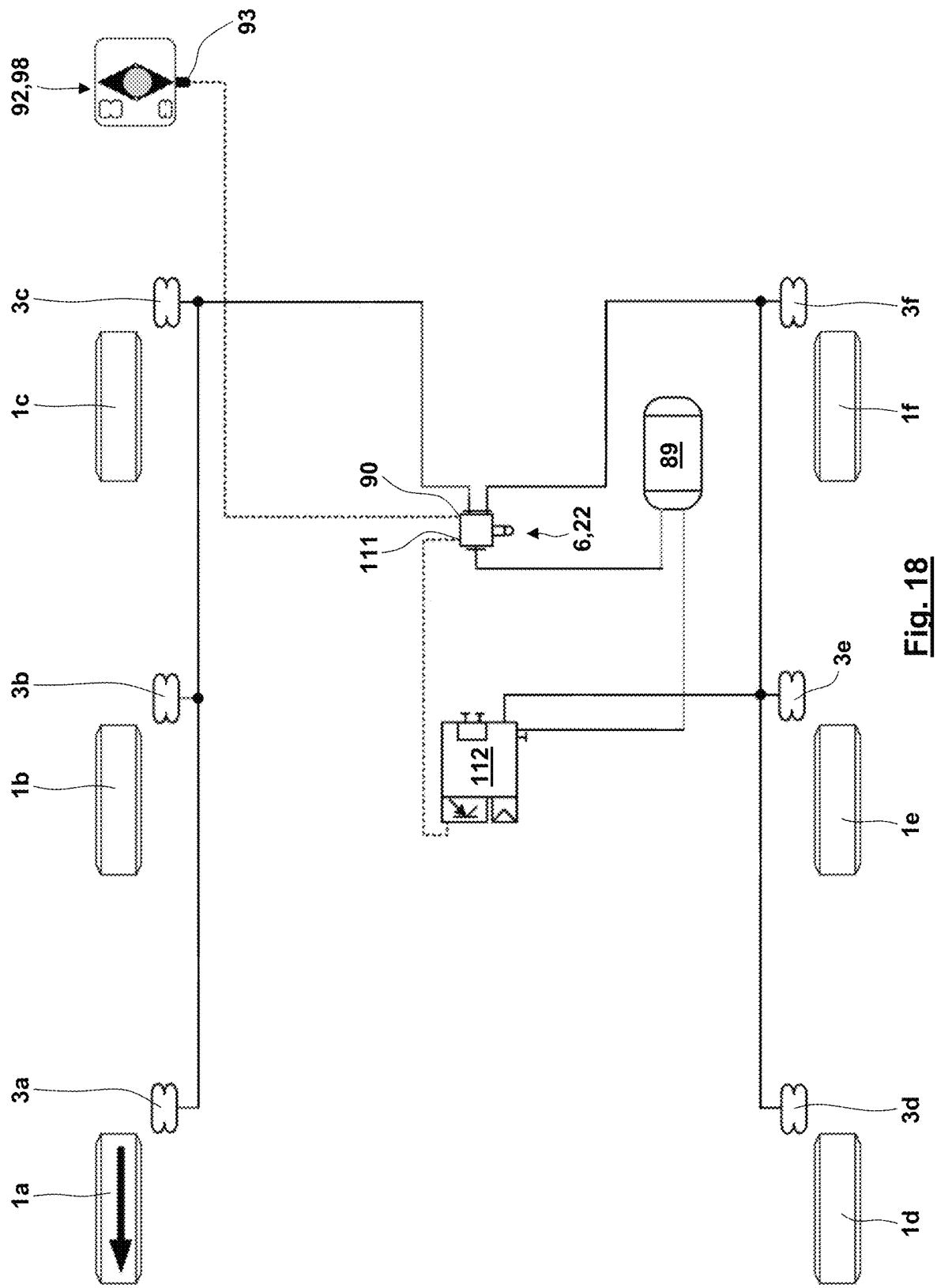

FIG. 18 shows an embodiment wherein the actuation element 92 itself is embodied as an electronic control device 92 and comprises a control outlet 93. Via the control outlet 93, a control signal is transmitted to the port 90 of the level control valve device 22. Here, too, it is possible that in the opposite direction, e.g. via a bidirectional line, a signal with respect to a level 5 of the level control valve device 22 is transmitted from the level control valve device 22 to the control device 92 or the operating element 98 for further processing in the control device 92. On the other hand, a signal of the level 5 is transmitted to another control device, which here is an EBS control unit 112, for further processing via an outlet 111 of the level control valve device 22. In this case, the EBS control unit 112 is not responsible for the electronic control of the level control valve device 22, but, rather than that, solely for the control of the brakes. It is possible here that signals are transmitted between single components via a bus system, e.g. between the operating element 98 and the level control valve device 22 and/or the level control valve device 22 and the EBS control unit 112. In this embodiment, too, a conventional lifting-lowering selector valve 105 may be optionally additionally integrated into the control circuit 88.

It is also possible that the operating element 98 only transmits a switching signal to a control unit or circuit board of the level control valve device 22. Here, the signals of the operating element 98 can be directly supplied to the control unit of the level control valve device 22. The signals are processed on the control unit or circuit board of the level control valve device 22 (the same is true for the previous figures).

Figure 19:
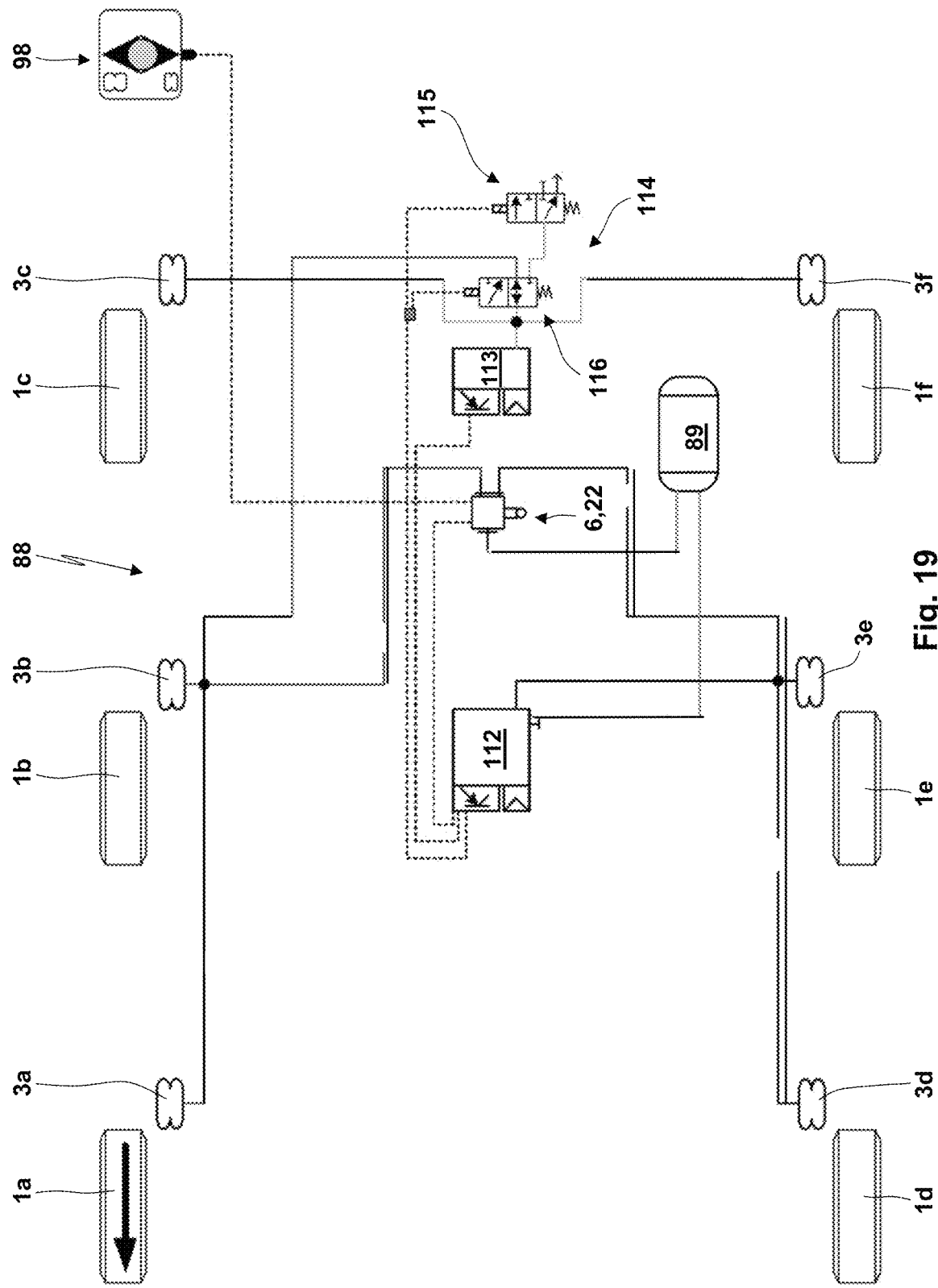

FIG. 19 shows an embodiment in which an additional electronic control unit 113 is present which defines a pneumatic pressure for a so-called load transfer valve device 114. The load transfer valve device 114 comprises solenoid valves 115, 116 which are also controlled by the EBS control unit 112. Here, it is the aim of the control via the EBS control unit 112 and the control unit 113 to bias the different axles of the vehicle with the same load.

Figure 20:
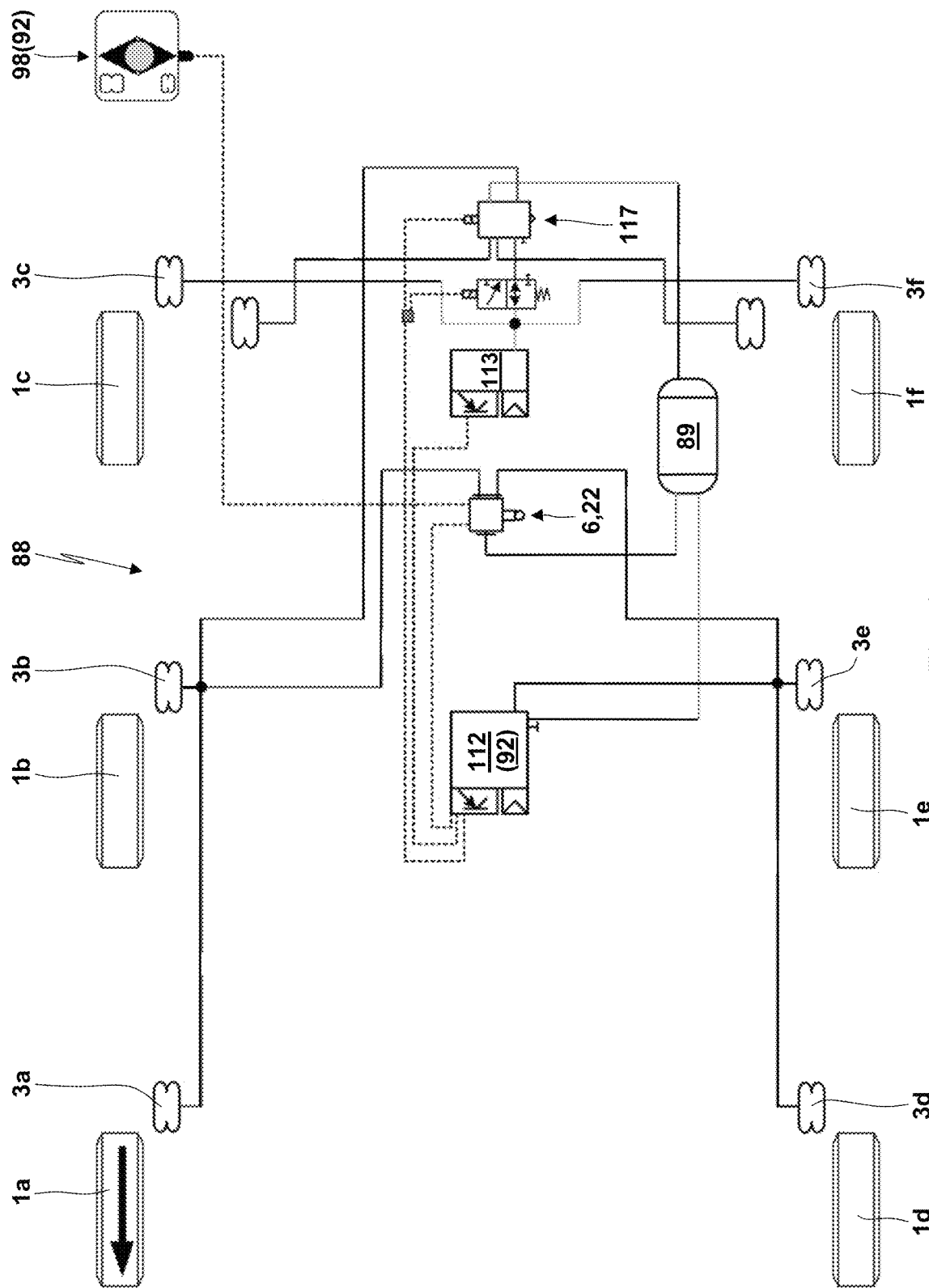

For the embodiment according to FIG. 20, the EBS control unit 112 is also responsible for the control of a lifting axle system 117.

Figure 21:
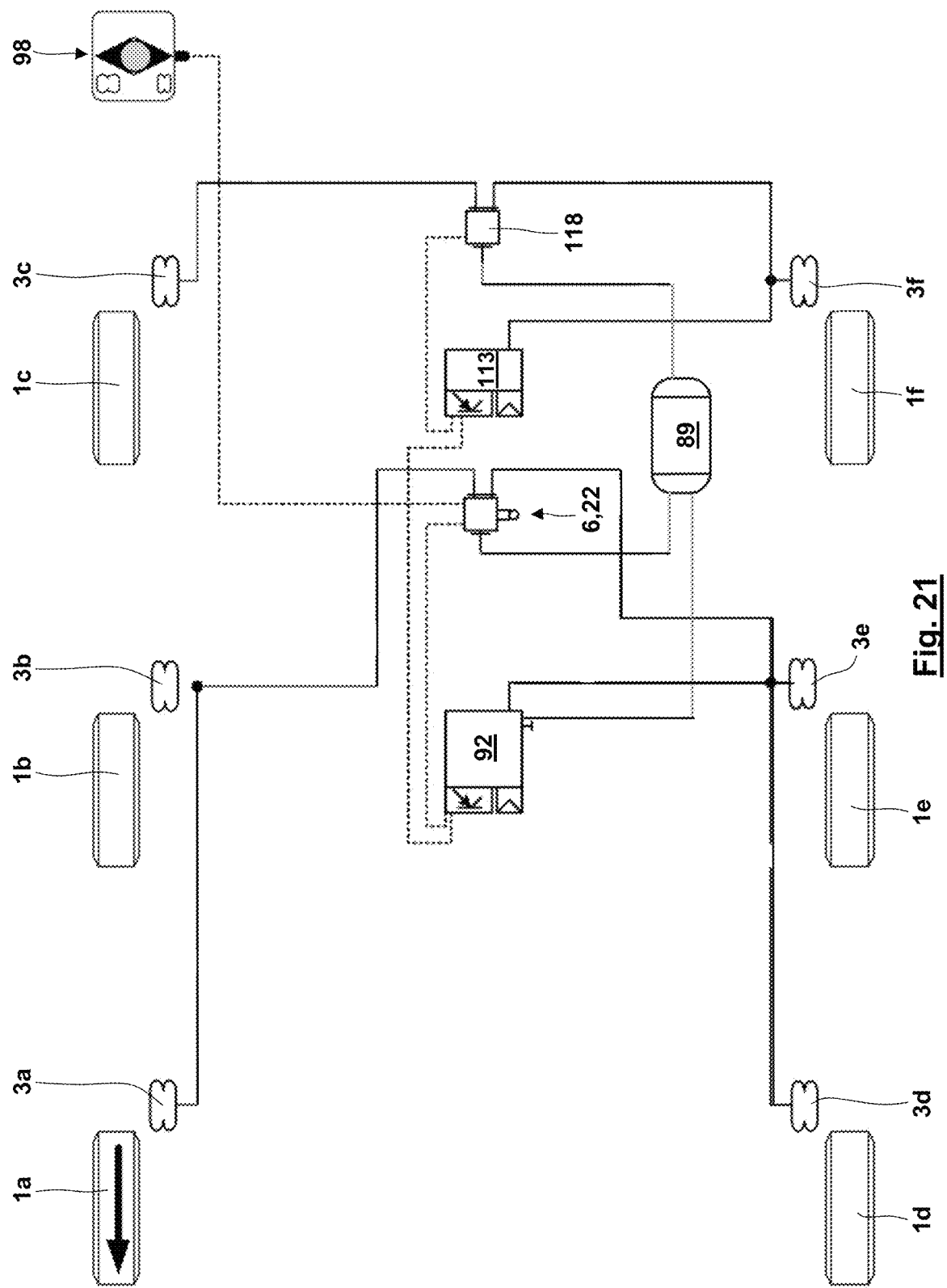

FIG. 21 shows an embodiment of the control circuit 88 in which a first control device 92 controls a level control valve device 6, 22, by which an electronic level control as well as a mechanical level control is possible. The level control valve device 22 in this case is responsible for a two-circuit level control of the air suspension bellows 3*a*, 3*b* and 3*d*, 3*e* of two vehicle axles. Another control device 113 purely electronically controls a second level control valve 118 via which the level control of the air suspension bellows 3*c*, 3*f* is achieved. The control devices 92, 113 communicate with one another, in which way an adjustment or modulation of the level of the air suspension bellows 3*a*, 3*b* and 3*d*, 3*e* on the one hand and the air suspension bellows 3*c*, 3*f* on the other hand is possible.

It is also possible for the embodiment shown that on the one hand the manual demand of the user may be set via the operating element 98, in which way then the operating element 98 with a control device of the same generates the control signal for controlling the actuator of the level control valve device 22. On the other hand, in other operating situations the actuator 21 of the level control valve device 22 can be controlled via the EBS control unit 112.

In the following, further optional embodiments of the level control valve device 22, the level control valve 6 and/or the control circuit 88 are mentioned which can be employed alternatively or cumulatively and/or in connection with one of the aforementioned embodiments:

For one embodiment of the invention, the electronic control device 92 comprises a control outlet 93 for a mechanically controlled level control valve device 22 as has been described before and is the object of the claims. For this embodiment, the control device 92 comprises control logic which generates a control signal at the control outlet 93 for a change of a relative position of a valve element 23 and a drive element 13 of the level control device 22 and/or a relative position of a counter valve element 29 with respect to a housing 7 accommodating the valve element 23 and the counter valve element 29.

Optionally, it is also possible that the control device comprises control logic which for a dynamic level control during drive operation generates a control signal for the actuator 21 on the basis of which the actuator 21 changes the relative position of the valve element 23 and the counter valve element 29 in such a way that a change of the relative position of the valve element 23 and the counter valve element 29 results. The absolute value of the change is different from the absolute value of the change of the relative position of the valve element 23 and the counter valve element 29 which would have resulted for purely mechanical level control.

Optionally, it is also possible that the control device 29 comprises control logic which for a dynamic level control creates a control signal for the actuator 21. On the basis of the control signal the actuator 21 changes the relative position of the valve element 23 and the counter valve element 29 in such a way that the valve element 23 and the counter valve element 29 remain in the first relative position or are transferred into the first relative position 84, although based on a purely mechanical level control the second or third relative position 86, 87 would result.

It is optionally possible that the control device comprises control logic which on a control outlet 93 generates a reset-to-ride control signal for a lifting-lowering selector valve 105.

In one embodiment, the control device 92 may comprise a bidirectional port 109 and/or an interface for a bus system 104.

It is possible that the control device 92 comprises a mechanical-electrical operating element 98 via which a user may change the level.

It is possible that the control device 92 is formed integrally with an ABS or EBS control unit 113 or another control unit.

It is possible that the control device 92 comprises an electric outlet port which is connectable to a solenoid valve 115, 116 or a control unit 113 of a load transfer valve device 114.

It is furthermore possible that an electronic control device 92 as has been explained above is a part of an electropneumatic control circuit 88 together with a level control valve device 22 connected to the control outlet 93 of the electronic control device 92.

Optionally, this control circuit 88 may also comprise a manually actuatable mechanical-pneumatic lifting-lowering selector valve 105 via which a user may induce a change of the level 5.

It is possible that the control circuit 88 comprises a manually actuatable operating element 98. The electric control signal of the operating element 98 set by the user is supplied to a control inlet 96 of the electronic control device 92, which may be done in order to transmit a demand of the user for a lifting or lowering.

It is also possible that at least one sensor 55, 56 is present in the control circuit which senses a relative position of the drive element 13 or the driveshaft 11 and the actuation element 24 or a position of the drive element 13, the driveshaft 11 and/or the actuation element 24. In this case, based on a signal of at least one sensor 55, the control logic of the electronic control device 92, 56 determines the control signal for the actuator 21 of the level control valve device.

It is also possible that the commercial vehicle is embodied as a dumper. In this case, the control device 92 may control the actuator 21 in dependence of a dump signal in such a way that a shift of the gravity center of the dumper due to the tilting of a trough or other vehicle body can be counteracted by a level change.

It is also possible for the control device 92 to adapt the level 5 during drive operation of the commercial vehicle in dependence of the driving speed.

Furthermore, the control device 92 can control a blocking position of the level control valve in which a mechanical level control is deactivated, which may especially occur in order to avoid so-called "cycling" when driving through a curve and/or when braking or accelerating e.g. in the region of traffic lights.

It is also possible that in a control device 92 predefined reference levels are stored which then can be activated by the user on the operating element 98 and/or are automatically chosen by the control device depending on conditions of operation and then are set by the actuator 92.

It is also possible that when, e.g. via a GPS sensor, a known target, especially a ramp, is detected, a suitable level height is automatically induced.

It is also possible that the control device 92 or the level control valve 6 directly communicates with a smartphone so that a level change may also be preset via the smartphone. In this way then the smartphone may take over at least partial functions of the operating element 98. Preferably, a step motor is used as the actuator 21.

The mechanical level control and the electronic level control use the same valve components for providing a blocking, an aeration and a deaeration of air suspension bellows. For the embodiments according to FIGS. 3 to 13, these valve components are integrated into the housing 7 of the level control valve.

It is also possible that the actuator 21 is effective directly between the vehicle wheel 1 or the vehicle axle 2 and the coupling mechanism 12, e.g. with a rotation of the driveshaft 14 induced by the actuator 21.

Figure 22:
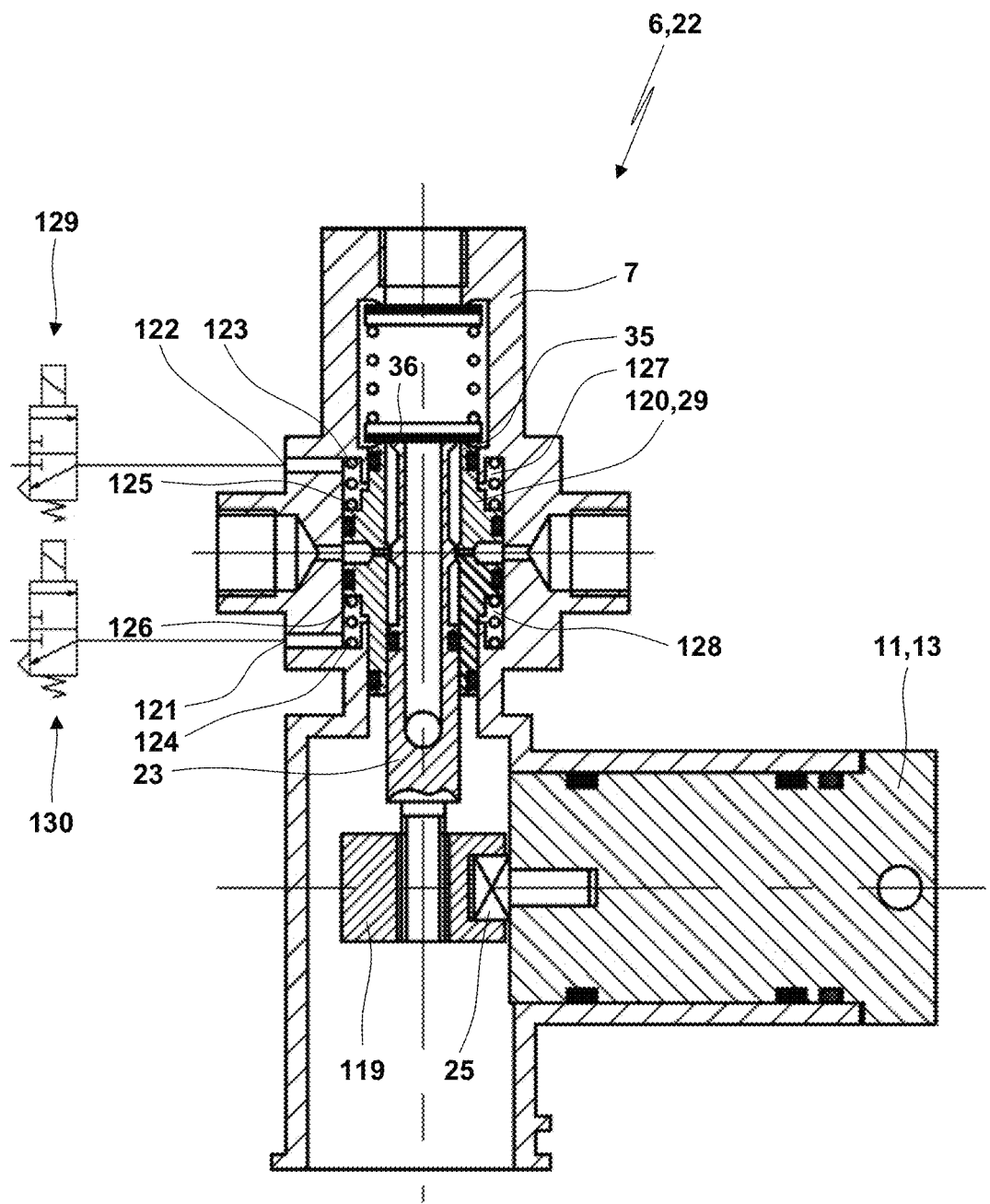
FIGS. 22 to 24 show further embodiments of a level control valve.

FIG. 22 shows a further embodiment of a level control valve 6 in a longitudinal section. The drive element 13 formed by the driveshaft 11 drives the valve element 23 via an eccentric 25 without an interposition of a further transmission mechanism (such as a planetary gear mechanism 41). In order to simplify mounting and/or to guarantee a manual adjustability of the reference position of the level control valve 6, the valve element 23 may be connected to a contact body 119 actuated by the eccentric 25 via a threaded connection as shown. For this embodiment, the valve seat 35 is not formed by the housing 7 of the level control valve 6 but, rather than that, it is formed by an actuating piston 120. Assuming a fixed actuating piston, aeration occurs in dependence of the rotation of the driveshaft 11 and the position of the valve element 23 in a lower position of the valve body 23 correlated therewith. In the valve position according to FIG. 22 the air suspension bellows are blocked and in a valve position lifted with respect to FIG. 22 the air suspension bellows are aerated. The reference position, which here is the blocking position according to FIG. 22, can be changed by shifting the actuating piston 120, which therefore forms the counter valve element 29 responsible for setting the reference position.

A movement of the actuating piston 120 can be induced as follows:

The housing 7 comprises two pneumatic control ports 121, 122. The actuating piston 120 is axially slidably guided in a recess of the housing 7. The central operating position of the actuating piston 120 shown in FIG. 22 is secured by springs 123, 124 which bias the actuating piston 120 in opposing directions. With a piston surface 125, 126 and the recess of the housing 7, the actuating piston 120 therefore limits pressure chambers 127, 128, into which a corresponding control port 121, 122 opens. The piston surfaces 125, 126 of the actuating piston 120 have orientations opposite to one another. Biasing the control ports 121, 122 is achieved via solenoid valves 129, 130, which here are 3/2-way solenoid valves. In the operating position active in FIG. 22, the solenoid valves 129, 130 deaerate the corresponding pressure chambers 127, 128 while switching one of the solenoid valves 129, 130 leads to a selective aeration of the corresponding pressure chamber 127, 128. The pressure force induced on the piston surface 125 when the pressure chamber 127 is pressurized results in the actuating piston 120 being shifted downwards against the biasing by the spring 126 until the actuating piston 120 is pressed against a stop of the housing 7. Correspondingly, via the pressurization of the pressure chamber 128 the actuating piston 120 can be moved upwards from the position according to FIG. 22, against the biasing by the spring 123. According to FIG. 22, without pressurization of the pressure chambers 127, 128 (or for a simultaneous pressurization of both pressure chambers 127, 128) a central first reference position results, while the pressurization of the pressure chamber 127 without pressurization of the pressure chamber 128 leads to a second, lower reference position and the pressurization of the pressure chamber 128 without pressurization of the pressure chamber 127 leads to a third, raised reference position. The solenoid valves 129, 130 may be controlled via electric control lines by any control unit, for example an EBS control unit. Pressurized air from a pressurized air source (which preferably is the same pressurized air source from which the air suspension bellows are also filled) is supplied to the solenoid valves 129, 130. It is also possible that the solenoid valves 129, 130 are integrated into a control unit, especially integrated into an EBS control unit so that only two pneumatic line connections between the control unit and the level control valve 6 are necessary. For the embodiment according to FIG. 22, the actuating piston 120 is realized as a sleeve, which on the side turned towards the valve plate 36 forms the valve seat 35, which is sealed with respect to the housing 7 via sealing elements in both end portions, which between these sealing positions forms a kind of annular piston with the two piston surfaces 125, 126, which on both sides of transverse bores is also sealed with respect to the housing in order to form the outlets 31 and through the inner bore of which the valve element 23 extends.

Figure 23:
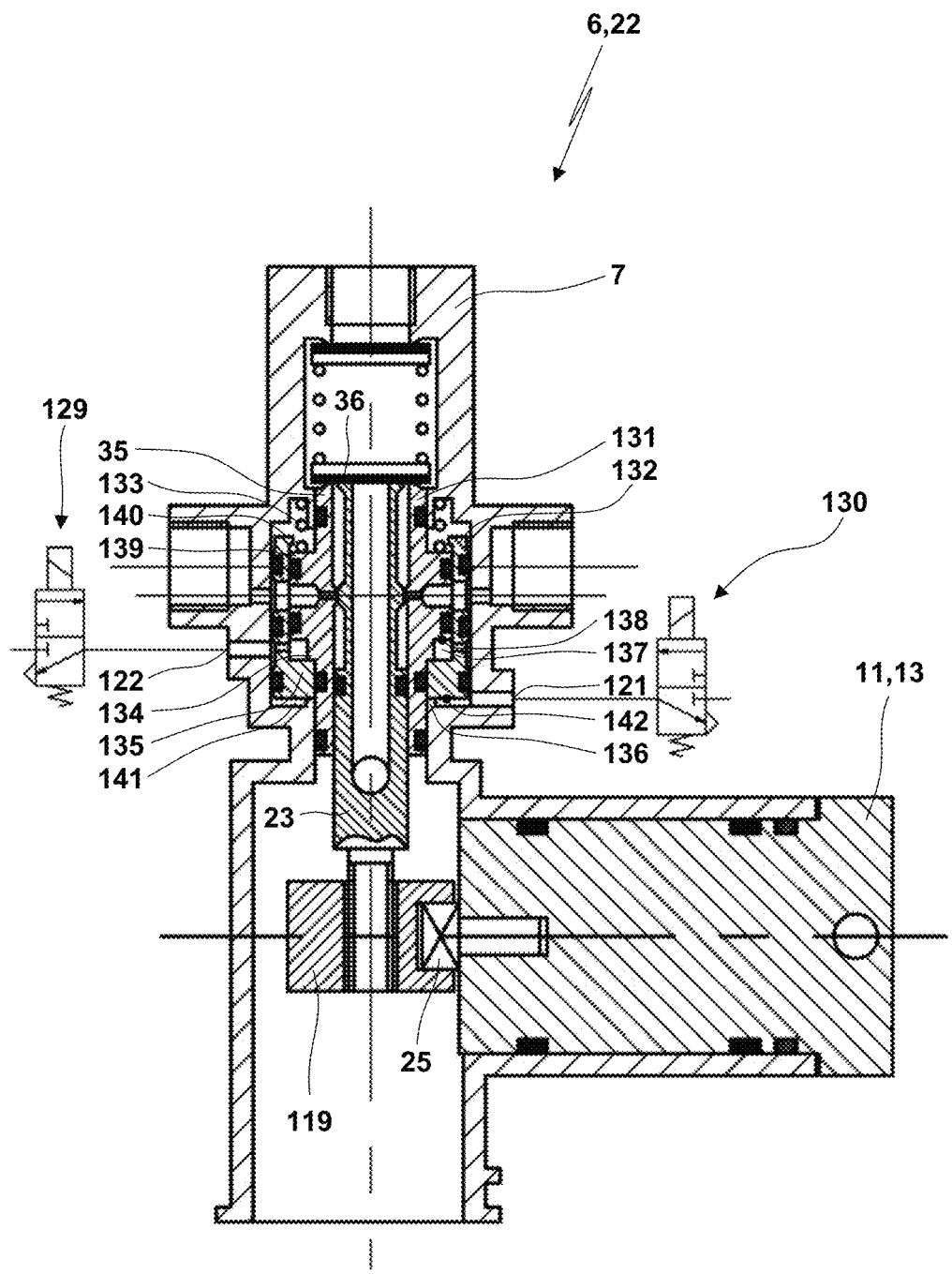

For the embodiment according to FIG. 23, the actuating piston 120 is realized with two telescopable and sleeve-like actuating piston parts 131, 132. In the end portion turned towards the valve plate 36, the actuating piston part 131 arranged on the radial inner side forms the valve seat 35. A spring 133 presses a collar 134 of the actuating piston part 131 against an inner collar 135 of the actuating piston part 132. In this way, the actuating piston part 132 is also pressed against a collar 136 of the housing 7. In this way, a first, lowest reference position of the actuating piston part 131 is defined. By switching the solenoid valve 129, a pressure chamber 137 can be pressurized. The pressure chamber 137 is limited by a piston surface 138 of the actuating piston part 131. By biasing the pressure chamber 137 and by the pressure force induced on the piston surface 138, the actuating piston part 131 can be moved upwards relative to the actuating piston part 132 against the biasing by the spring 133 until a collar 139 of the actuating piston part 131 contacts an inner collar 140 of the actuating piston part 132. In this way, a second, lifted reference position is defined. If a third, further raised reference position is to be induced, via the solenoid valve 130 a pressure chamber 141 is pressurized which is limited by a piston surface 142 formed by the lower front face of the actuating piston part 132. The pressure force generated here may lead to a common movement of the two actuating piston parts 131, 132 against the biasing by the spring 133, where still the collar 139 contacts the inner collar 140.

If the actuating displacements caused by means of the pressurization of the pressure chambers 137, 141 are different, a further reference position may be induced by pressurization of the pressure chamber 141 without pressurization of the pressure chamber 137. If further reference positions are intended to be inducible, further correspondingly nested sleeve-like actuating piston parts with corresponding pressure chambers and corresponding solenoid valves may be employed.

Figure 24:
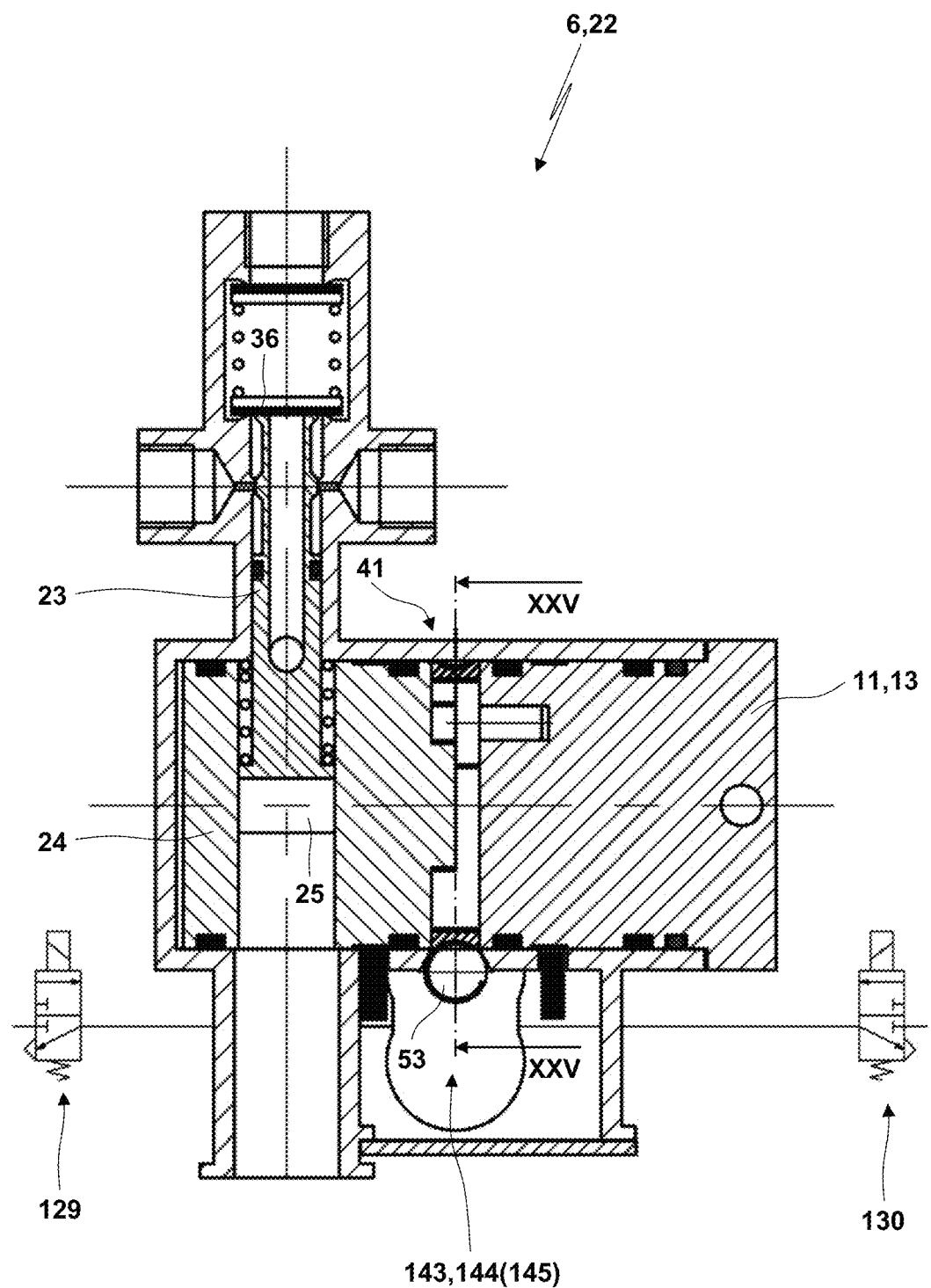
Figure 25:
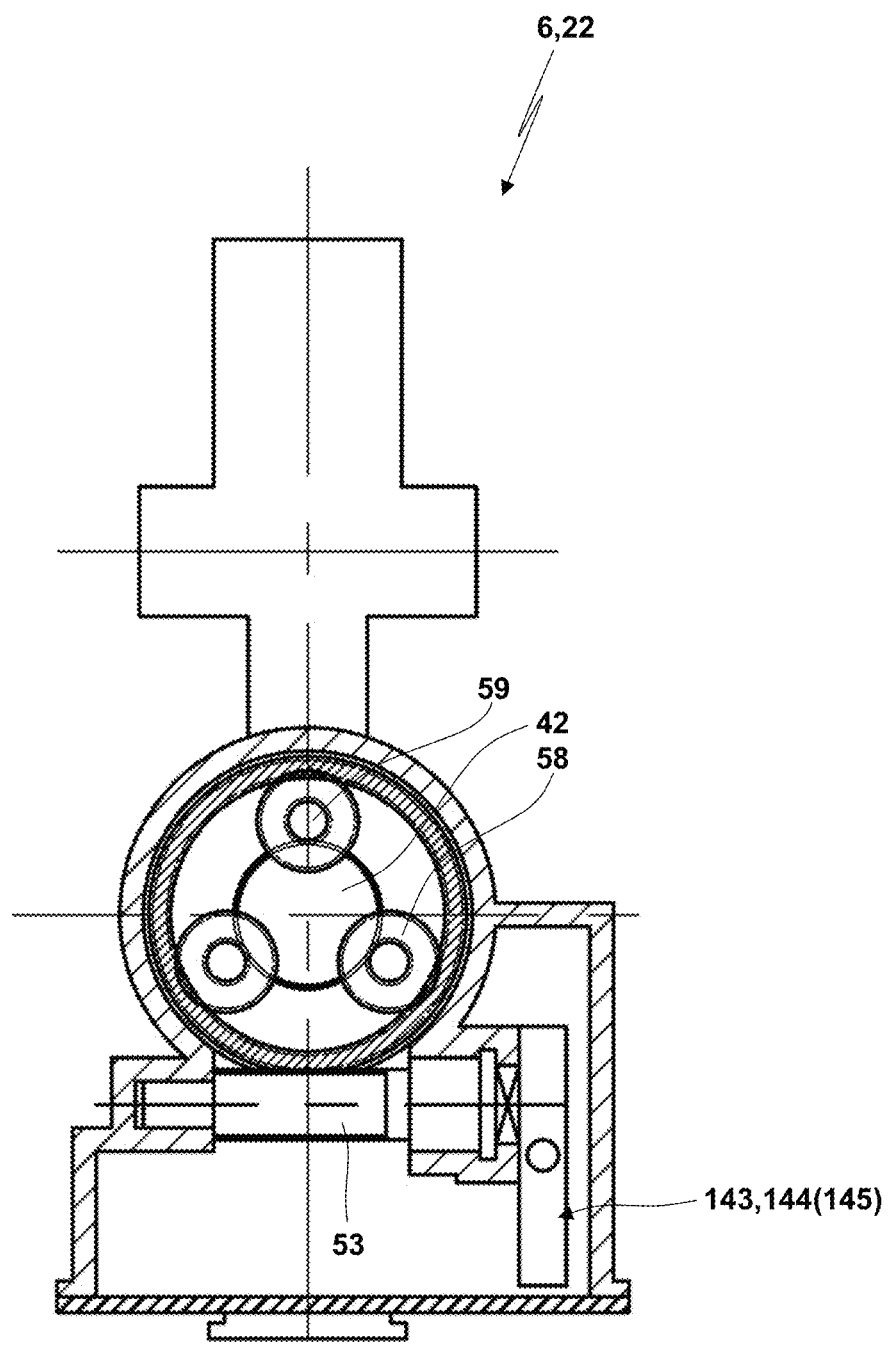
FIG. 25 shows a cross section XXV-XXV through the level control valve according to FIG. 24.

The embodiment according to FIGS. 24 and 25 generally corresponds to the embodiment according to FIG. 6. However, here a rotation of the driveshaft 53 is not induced by means of an electric drive aggregate 54. Rather than that, the driveshaft 53 is driven by a pneumatically operated actuator 143. Preferably, the pneumatically operated actuator 143 is a multi-disc motor 144 or a rotary piston motor 145. An actuating movement and/or an actuating angle may be pneumatically influenced, which may be achieved via the solenoid valves 129, 130.

FIG. 26 schematically shows an air suspension device 146 which here comprises two circuits with circuits 147, 148 with air suspension bellows 3a to 3f.

A level control valve 6 comprises ports 9, 10 for the two circuits 147, 148. The level control valve 6 furthermore comprises a port 8 which is connected to a pressurized air source (especially a reservoir) in order to supply the level control valve 6. In the level control valve 6, a check valve 38 is arranged, which enables a supply of pressurized air into the interior of the housing 7 from the port 8, but inhibits pressurized air escaping via the port 8.

Here, the valve which, depending on the level of the air suspension bellows 3 and after actuation of an actuator 21, induces an aeration, a deaeration and a blocking of the air suspension bellows 3 is embodied as a double-seated valve 149. The double-seated valve 149 comprises a valve seat body 150 forming a valve seat 35, a valve element 23, which here is embodied as a hollow body connected to a deaeration device 151 and a valve plunger, and a valve plate 36. The valve plate 36 is biased by a spring 34 towards the valve seat 35. If due to this biasing the valve plate 36 contacts the valve seat 35, the double-seated valve 149 blocks the transmission of pressurized air from the port 8 to the ports 9, 10, in which way no aeration of the air suspension bellows 3 is possible. The valve element 23 is mechanically coupled with a corresponding axle of the vehicle or a vehicle wheel in such a way that depending on the level of the axle or the vehicle wheel a relative position of the valve element 23 with respect to the valve plate 36 and/or the valve seat 35 is changed. The valve element 23 can preferably take on the following relative positions:

a) In the relative position effective in FIG. 26, the valve element 23 contacts the valve plate 36 with its front face. In this way, a connection of the ports 9, 10 to the deaeration device 151 via an inner bore 37 of the valve element 23 is blocked so that no deaeration of the air suspension bellows 3 is possible. At the same time, as has been explained before, via the valve plate 36 contacting the valve seat 35 the connection of the port 8 to the ports 9, 10 is blocked so that no deaeration of the air suspension bellows 3 is possible, either. Therefore, this is a blocking position of the double-seated valve 149.

b) If, due to an undesired decrease of the level, the valve element 23 is moved upwards in FIG. 26, the valve plate 36 (continuing to seal the transfer of pressurized air to the deaeration device 151 via the inner bore 37) is moved upwards and away from the valve seat 35, so that the port 8 is connected to the ports 9, 10 and the air suspension bellows 3 are aerated. Therefore, this is an aeration position of the double-seated valve 149.

c) If, on the contrary, for a level that is too high the valve element 23 is moved downwards from the original position according to FIG. 26, the valve plate 36 cannot follow the valve element 23, but the valve plate 36 is pressed against the valve seat 35 by the spring 34. Therefore, a connection of the ports 8, 9, 10 is interrupted and there can be no aeration of the air suspension bellows 3. Due to the downwards movement of the valve element 23 in FIG. 26, a transition cross section between the front face of the valve element 23 and the valve plate 36 is created, in which way then, however, a transition of pressurized air from the ports 9, 10 via the mentioned transition cross section and the inner bore 37 to the deaeration device 151 can occur. Therefore, for such a relative position the air suspension bellows 3 are deaerated. Therefore, this is a deaeration position of the double-seated valve 149.

For the embodiment shown (without this necessarily having to be the case), the double-seated valve 149 is connected to the ports 9, 10 via a ring chamber 152 formed between the outer surface of the valve element 23 and the inner surface of the valve seat body 150 neighboring the valve seat 35 and at least one throttle bore 153 running through the valve seat body 150 in the radial direction. Optionally, it is also possible that the valve element 23—as shown in FIG. 26—comprises a collar or a control edge 154, which in the blocking position of the double-seated valve 149 effective in FIG. 26 at least partially covers the throttle bores 153 while the collar or the control edge 154 in the aerating and deaerating position of the valve element 23 may uncover the throttle bores 153. The at least one throttle bore 153 for example comprises a maximum diameter in the region of 2.50 to 3.00 mm, especially 2.70 to 2.90 mm.

The position of the blocking position and therefore a reference position of the level control valve 6, which correlates to a reference level of the axle or the vehicle wheel, can be changed by a movement of the valve seat body 150. While according to the embodiment shown in FIGS. 22 and 23 a movement of the valve seat body 150 is controlled via an electric actuator, which is realized as an electronically controlled pneumatically actuated actuating piston, for the embodiment according to FIG. 26 the change of the position of the valve seat body 150 is achieved via an actuator 21, which is realized as an electrical drive 155. The electrical drive 155 may be a linear drive or a rotational drive, which then directly or with any transmission mechanism interposed or another mechanical transmission device may induce the desired translational movement of the valve seat body 150. For the embodiment shown in FIG. 26, the electrical drive 155 drives the valve seat body 150 via a threaded drive or spindle drive 156. The spindle drive 156 comprises a spindle nut 157 which is guided rotatably, but not axially shiftable with respect to the housing 7. The spindle nut 157 is driven via a transmission mechanism or as shown here directly by the electrical drive 155, that is, rotated. The spindle nut 157 with its inner thread 158 meshes with an outer thread 159 of the valve seat body 150. The valve seat body 150 is guided in the housing 7 in such a way that it can be moved translationally for opening and closing the double-seated valve 149 but no rotation of the valve seat body 150 is possible. The end portion of the valve seat body 150 forming the outer thread 159 forms a spindle 160 of the spindle drive 156. For the embodiment shown, the valve seat body 150 is secured against rotation via a protrusion 161 of the valve seat body 150 which is guided in a longitudinal groove 162 of the housing 7 without play or with only minor play in the circumferential direction.

For the embodiment according to FIG. 26, a special coupling of a level change to the translational movement of the valve seat body 23 is employed without this necessarily having to be the case: Between a linkage 163 moved, that is, pivoted with the vehicle wheel or the vehicle axle a further spindle drive 164 is employed. A spindle nut 165, which is supported on the housing 7 rotatably but not axially shiftable, is connected to the linkage 163 so that the spindle nut 165 is rotated together with the linkage 163. The spindle nut 165 comprises an inner thread 166 which meshes with an outer thread 167 of an end portion of the valve element 23, which therefore forms a spindle 168 of the spindle drive 164. The valve element 23 is axially shiftable, but not rotatable around the longitudinal axis. For the embodiment shown, this is achieved by the valve seat body 150 comprising at least one protrusion 169 in the recess for the passage of the valve element 23, the protrusion 169 being guided in a longitudinal groove 170 without play in the circumferential direction or with a small play. Therefore, the valve element 23 is rotationally fixedly coupled with the valve seat body 150 while the valve seat body 150 in turn is coupled rotationally fixedly with the housing 7.

It is possible that the position of the valve seat body 150 and/or a change of the position is directly or indirectly sensed by a sensor. The sensor may sense the position directly. It is possible that a contact-less sensor is employed, for example a sensor based on the Hall effect. The sensor may sense the absolute position of the valve seat body 150 relative to the housing 7. It is also possible, however, that (as shown schematically in FIG. 26) a sensor 176 is integrated into the drive 155. The sensor 167 may e.g. be embodied as a rotation angle sensor which may be connected to a control unit 171. A rotation angle sensed by means of the sensor 176 may be converted into a change of the position of the valve seat body 150 in a simple way, taking account of the drive characteristics of the spindle drive 156.

The actuator 21 or the electrical drive 155 is controlled via an electronic control unit 171 comprising an ECU 172. Via a line or a data bus 173, the control unit 171 is for example connected to an electric power supply or a serial data interface, e.g. a CAN bus. Furthermore, the control unit 171 is connected to a manual operating unit 175 via a data bus or a line 174, via which the user may define a manual change of the desired level, for example for lifting or lowering the level at a ramp for loading and unloading. It is also possible that via the or a manual operating unit and/or automatically by means of the control unit an automatic adaption of the level height is achieved, which for example may be the case in order to guarantee different driving heights especially during driving in town, on a country road and on a motorway. It is also possible that via the control unit 171 a so-called "reset-to-ride function" is carried out in which via the actuator 21 the desired level for the drive operation is restored from a manually set ramp level. It is also possible that an automatic adaption onto the level of a vehicle ramp is achieved via an automatic electronic control of the electric drive 155 if for example via mechanical or optical means a ramp height is determined or for example when an approach to a ramp with a given ramp height is detected, this ramp height is adapted to when the ramp is approached. For the embodiment according to FIG. 26, the spindle nut 165, which is rotationally fixedly connected to the linkage 163 and is rotatably supported with respect to the housing 7, forms the drive element 13, which in turn forms the rotatable driveshaft 11 of the level control valve 6.

If via the electronic control of the actuator 21 a desired level or any ramp level has been set once, via the mechanical level control a level control is still possible without electric power supply, that is, upholding the electronically achieved level or ramp level. This may be the case in standstill as well as when the vehicle is driven. It is possible that an electronic change of the desired level is also achieved by means of an electric cord-bound or cordless remote control.

Preferably, the level control valve device 22 comprises a storage device via which, even when there is no electric power supply, data, such as for example a current desired level or ramp level, can be stored. It is possible that as the electric drive 155 a drive unit is employed which on the one hand comprises an electric motor and on the other hand comprises an integrated transmission mechanism.

Many variations and modifications may be made to the preferred embodiments of the invention without departing substantially from the spirit and principles of the invention. All such modifications and variations are intended to be included herein within the scope of the present invention, as defined by the following claims.

We claim:

1. An air suspension system of a commercial vehicle comprising:
    an electronic control device comprising a control outlet and control logic;
    a level control valve device connected to the control outlet of the electronic control device, the level control valve device comprising a port for an air suspension bellow, a port for an aeration device, a port for a deaeration device, a drive element mechanically coupled to a vehicle wheel or a vehicle axle, a valve element coupled to the drive element by a drive mechanism such that a movement of the drive element induces a change of an operating position of the valve element, and a counter valve element, wherein the valve element and the counter valve element have a first relative position in which the port for the air suspension bellow is blocked, a second relative position in which the port for the air suspension bellow is connected to the port for the aeration device and a third relative position in which the port for the air suspension bellow is connected to the port for the deaeration device; and
    an actuator that is controlled via the control outlet of the electronic control device, wherein when a level change for lifting or lowering a vehicle body at a ramp is set manually by an operator, the control logic generates a control signal at the control outlet that causes the actuator to induce a change of a relative position of the valve element and the drive element corresponding to the level change set by the user.

2. The air suspension system according to claim 1, wherein the electronic control device further comprises control logic which, for a dynamic level control during drive operation, generates a control signal for the actuator, on the basis of which the actuator changes a relative position of
    the valve element and the counter valve element or
    the counter valve element and a housing accommodating the valve element or the counter valve element
such that a change of the relative position of
    the valve element and the counter valve element or
    the counter valve element and the housing accommodating the valve element or the counter valve element
results, the absolute value of which differs from a value of a change of the relative position of
    the valve element and the counter valve element or
    the relative position of the counter valve element and the housing accommodating the valve element or the counter valve element
which would have resulted due to purely mechanical level control.

3. The air suspension system according to claim 1, wherein the electronic control device further comprises control logic, which for a dynamic level control, generates a control signal for the actuator, on the basis of which the actuator changes a relative position of
    the valve element and the counter valve element or
    the counter valve element and a housing accommodating the valve element or the counter valve element
    in such a way that the valve element and the counter valve element remain in the first relative position or are transferred into the first relative position whereas based on a purely mechanical level control the second relative position or the third relative position would result.

4. The air suspension system according to claim wherein the electronic control device comprises an inlet via which a dump signal for a trough or the vehicle body is fed to the electronic control device, and wherein the control logic of the electronic control device generates a control signal at the control outlet for the level control valve device which controls the actuator in such a way that the level is changed so that a shift of the gravity center of the trough or the vehicle body due to a tilting of the trough or the vehicle body is at least partially compensated.

5. The air suspension system according to claim 1, wherein the control logic generates a reset-to-ride control signal at the control outlet for a manually actuated lifting-lowering selector valve.

6. The air suspension system according to claim 1, wherein the electronic control device further comprises at least one of a bidirectional port and an interface for a bus system.

7. The air suspension system according to claim wherein the electronic control device further comprises a mechanical-electrical operating element via which a level can be set by the operator.

8. The air suspension system according to claim 7, wherein the electronic control device further comprises a port for receiving an electric operating signal of the mechanical-electrical operating element.

9. The air suspension system according to claim 1, wherein the electronic control device is one of anti-lock braking system (ABS) control unit and an electronic braking system (EBS) control unit.

10. The air suspension system according to claim 1, wherein the electronic control device further comprises an electric control outlet which is connectable to a valve or a control unit of a load transfer valve device.

11. The air suspension system according to claim 1, further comprising:
a manually actuatable mechanic-pneumatic lifting-lowering selector valve; via which the operator is able to manually set a change of the level.

12. The air suspension system according to claim 1 comprising a manually actuatable mechanical-electrical operating element that produces an electric operating signal that is set by the operator, and wherein the electric operating signal is fed to a control inlet of the electronic control device.

13. The air suspension system according to claim 1, further comprising:
at least one sensor that generates a signal sensing one of a) a relative position of the drive element and an operating element and b) one of a position of the drive element, a position of the driveshaft and a position of an actuation element, and wherein the control logic of the electronic control device determines the control signal for the actuator of the level control valve device based on the signal generated by the sensor.

14. The air suspension system according to claim 1, wherein the electronic control device further comprises control logic which, when there is dynamic level control in order to avoid cycling the vehicle body, generates a control signal for the actuator, on the basis of which the actuator changes a relative position of the valve element and the counter valve element in such a way that the valve element and the counter valve element remain in the first relative position or are brought into the first relative position whereas based on a purely mechanical level control the second relative position or the third relative position would result.

15. The air suspension system according to claim 1, wherein the electronic control device further comprises control logic which, when passengers getting on board or off board are detected, generates a control signal for the actuator, on the basis of which the actuator changes a relative position of the valve element and the counter valve element in such a way that a reduced driving height results which simplifies getting on board or off board, or which, when it is detected that passengers have ceased getting on board or off board, generates a control signal for the actuator, on the basis of which the actuator changes the relative position of the valve element and the counter valve element in such a way that a predefined driving height results.

16. A method of controlling an air suspension system of a commercial vehicle, the method comprising;
an electronic control device comprising a control outlet and control logic;
a level control valve device connected to the control outlet of the electronic control device, the level control valve device comprising a port for an air suspension bellow, a port for an aeration device, a port for a deaeration device, a drive element mechanically coupled to a vehicle wheel or a vehicle axle, a valve element coupled to the drive element by a drive mechanism such that a movement of the drive element induces a change of an operating position of the valve element, and a counter valve element, wherein the valve element and the counter valve element have a first relative position in which the port for the air suspension bellow is connected to the port for the aeration device and a third relative position in which the cart for the air suspension bellow is connected to the port for the deaeration device;
an actuator that is controlled via the control outlet of the electronic control device; and
in the control logic, when a level change for lifting or lowering a vehicle body at a ramp is set manually by an operator, generating a control signal for the actuator at the control outlet, the control signal inducing a change of at least one of a relative position of the valve element and the drive element of the level control valve device and a relative position of the counter valve element and a housing accommodating the valve element and the counter valve element, wherein when the level change for lifting or lowering the vehicle body at the ramp that is set manually by the operator is made, the level change causes the actuator to change the relative position of the valve element and the drive element corresponding to the level change set by the operator.

* * * * *